(12) United States Patent  
Hillis et al.

(10) Patent No.: US 9,832,989 B2  
(45) Date of Patent: Dec. 5, 2017

(54) OCTAGON PORTABLE TREE PLATFORM

(71) Applicants: Minis R. Hillis, Rincon, GA (US); Richard D. Kessler, Rincon, GA (US); Michael R. Moulton, Guyton, GA (US)

(72) Inventors: Minis R. Hillis, Rincon, GA (US); Richard D. Kessler, Rincon, GA (US); Michael R. Moulton, Guyton, GA (US)

( * ) Notice: Subject to any disclaimer, the term of this patent is extended or adjusted under 35 U.S.C. 154(b) by 0 days.

(21) Appl. No.: 14/713,024

(22) Filed: May 15, 2015

(65) Prior Publication Data

US 2016/0330951 A1 Nov. 17, 2016

(51) Int. Cl.
| | | |
|---|---|---|
| *A01M 31/02* | (2006.01) | |
| *E06C 1/34* | (2006.01) | |
| *E06C 1/10* | (2006.01) | |
| *E06C 1/39* | (2006.01) | |
| *E06C 7/18* | (2006.01) | |

(52) U.S. Cl.
CPC .............. *A01M 31/02* (2013.01); *E06C 1/10* (2013.01); *E06C 1/34* (2013.01); *E06C 1/39* (2013.01); *E06C 7/188* (2013.01)

(58) Field of Classification Search
CPC .. A01M 31/02; E06C 7/16; E06C 1/04; E06C 1/39; E06C 1/393; E06C 1/34; E06C 5/32; E06C 1/10; E06C 7/188; E04G 2001/155
USPC .................................................. 182/150, 187
See application file for complete search history.

(56) References Cited

U.S. PATENT DOCUMENTS

| | | | | |
|---|---|---|---|---|
| 1,515,831 A | * | 11/1924 | Bush ........................ | H02G 1/02 182/113 |
| 3,565,212 A | * | 2/1971 | Johnson ................... | E04G 1/154 182/119 |
| 3,837,427 A | * | 9/1974 | Mattinson ................. | E04G 1/14 182/115 |
| 4,056,902 A | * | 11/1977 | Ziegler, Jr. .............. | E04H 15/04 182/188 |
| 4,253,549 A | * | 3/1981 | Petren ....................... | E04G 1/15 182/150 |
| 4,388,982 A | * | 6/1983 | Yonahara .................. | E04G 3/20 182/115 |
| 5,522,186 A | * | 6/1996 | Jarman .................... | E04H 15/04 182/187 |
| 5,575,938 A | * | 11/1996 | Ono .......................... | E04G 9/02 249/189 |
| 5,746,289 A | * | 5/1998 | Williams .................. | E04G 1/15 182/129 |

(Continued)

*Primary Examiner* — Daniel Cahn
(74) *Attorney, Agent, or Firm* — Nixon & Vanderhye P.C.

(57) ABSTRACT

A portable multi-use platform that is capable of providing 360 degree views for multiple persons safely and securely without interfering with each individuals comfort space. The platform can be easily set up and taken down and transported to different locations using a detachable wheeled frame assembly. The applications of this platform are not limited solely to hunting but can be used in numerous activities such as "zip-line" type sports, photography and video applications, utility pole climbing professions, as well as military and police operations. This platform solves the problem of partial views, limited occupants, and the transportation over terrain to and from site. It also addresses the issue of attaching to a plurality of various tree sizes with a sliding floor attachment system as well as a possible problem of tree lean and leveling with the use of a sliding "biter" system.

12 Claims, 61 Drawing Sheets

(56) References Cited

U.S. PATENT DOCUMENTS

| | | | | |
|---|---|---|---|---|
| 5,853,066 A * | 12/1998 | Gohn | A01M 31/02 | 182/116 |
| 5,908,084 A * | 6/1999 | Laurin | A01M 31/02 | 182/142 |
| 6,516,919 B1 * | 2/2003 | Sempel | A01M 31/02 | 182/187 |
| 7,958,968 B1 * | 6/2011 | Stabler | E04H 15/04 | 135/90 |
| 7,967,325 B1 * | 6/2011 | Burton | A01M 31/006 | 280/38 |
| 8,272,479 B1 * | 9/2012 | Leach | A01M 31/02 | 182/128 |
| 8,579,082 B1 * | 11/2013 | Owens | A01M 31/02 | 182/116 |
| 8,708,104 B1 * | 4/2014 | Sponsler | A01M 31/02 | 182/133 |
| 8,973,708 B1 * | 3/2015 | Fenner | A01M 31/02 | 182/12 |
| 2003/0178251 A1 * | 9/2003 | Hewitt | A01M 31/02 | 182/63.1 |
| 2003/0178253 A1 * | 9/2003 | Tatge | E04G 1/14 | 182/132 |
| 2003/0209388 A1 * | 11/2003 | Arsenault | A01M 31/02 | 182/187 |
| 2004/0075037 A1 * | 4/2004 | Krier | A01M 31/02 | 248/523 |
| 2005/0034921 A1 * | 2/2005 | Griffiths | A01M 31/02 | 182/20 |
| 2005/0077107 A1 * | 4/2005 | Libert | E04G 1/15 | 182/119 |
| 2006/0207831 A1 * | 9/2006 | Moore | A01M 31/006 | 182/20 |
| 2008/0128204 A1 * | 6/2008 | Engstrom | A01M 31/02 | 182/116 |
| 2009/0095569 A1 * | 4/2009 | Cooper | A01M 31/02 | 182/187 |
| 2009/0272709 A1 * | 11/2009 | Nessner | B66C 13/04 | 212/270 |
| 2009/0277721 A1 * | 11/2009 | Weir | A01M 31/02 | 182/115 |
| 2010/0300806 A1 * | 12/2010 | Ash | A01M 31/02 | 182/113 |
| 2011/0017250 A1 * | 1/2011 | Shih | E04H 15/04 | 135/90 |
| 2011/0024231 A1 * | 2/2011 | Wurth | E04G 3/24 | 182/113 |
| 2011/0308887 A1 * | 12/2011 | Johnson | A01M 31/02 | 182/187 |
| 2012/0211306 A1 * | 8/2012 | Benefield | E06C 7/16 | 182/115 |
| 2012/0299258 A1 * | 11/2012 | Gallagher | A01M 31/02 | 280/47.18 |
| 2014/0238776 A1 * | 8/2014 | Vandergraff | A01M 31/02 | 182/20 |
| 2015/0034420 A1 * | 2/2015 | Watson | E04G 1/152 | 182/222 |
| 2015/0167325 A1 * | 6/2015 | Watford | E06C 1/28 | 182/20 |
| 2015/0211298 A1 * | 7/2015 | Rogers | E06C 1/397 | 182/21 |

* cited by examiner

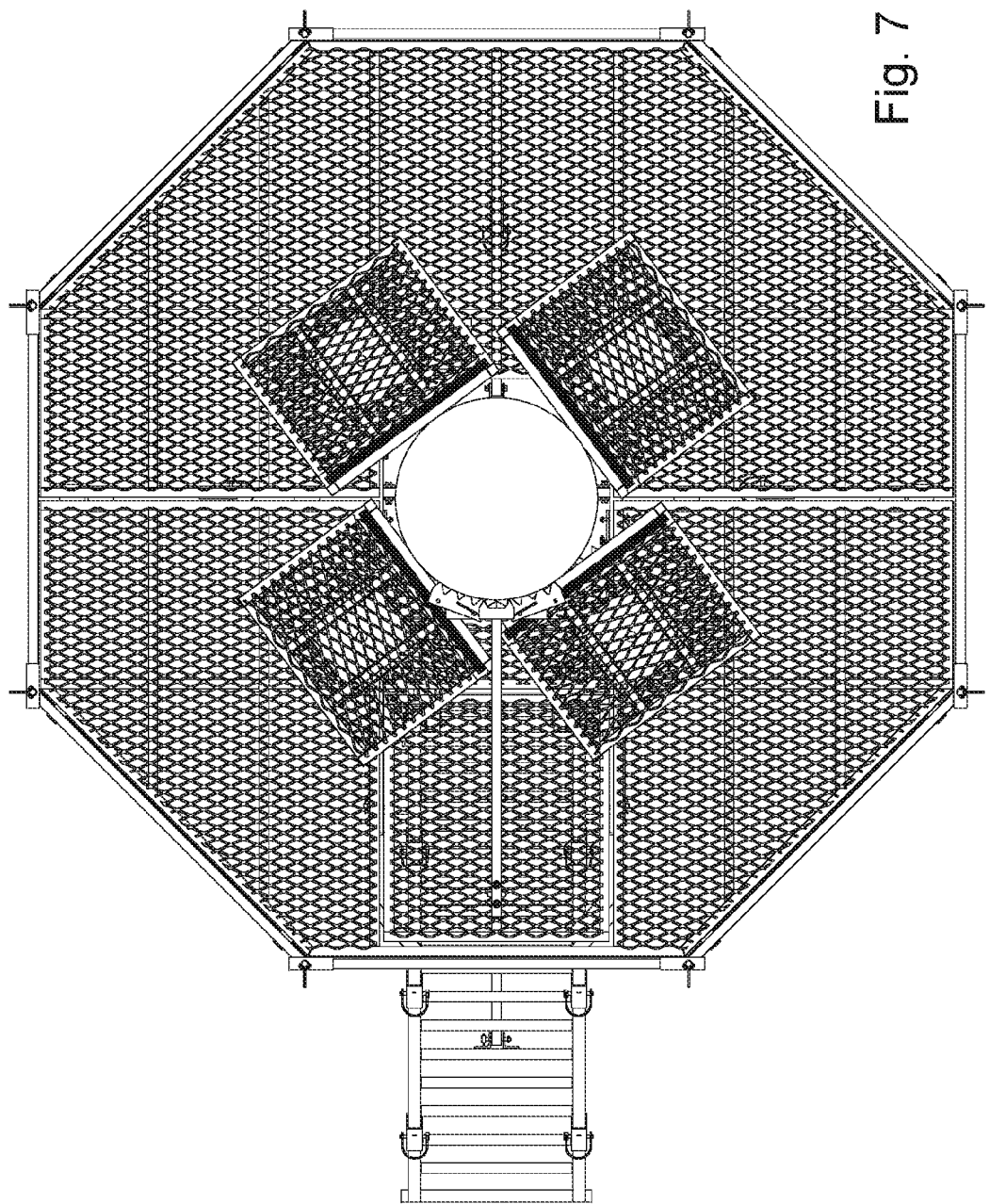

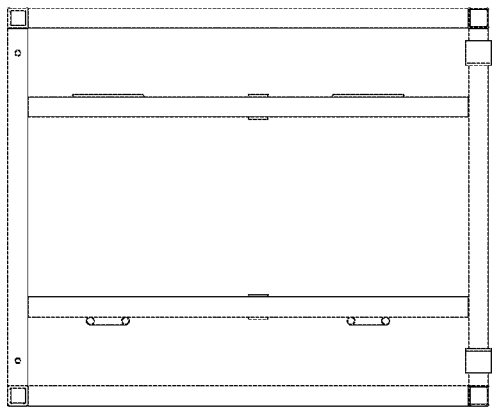
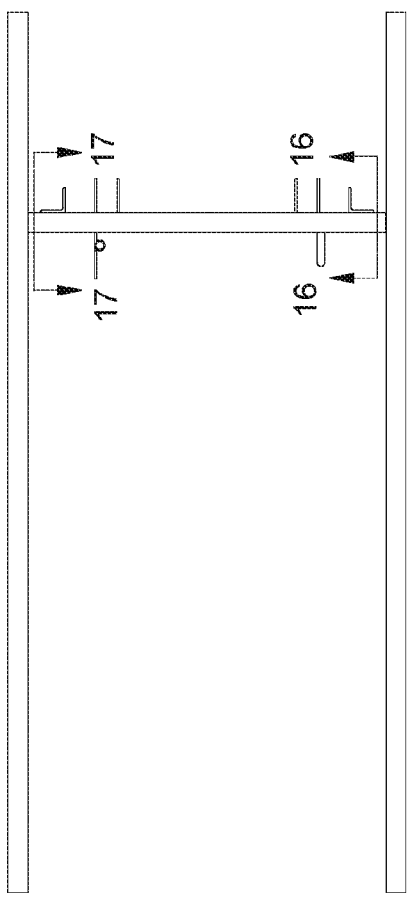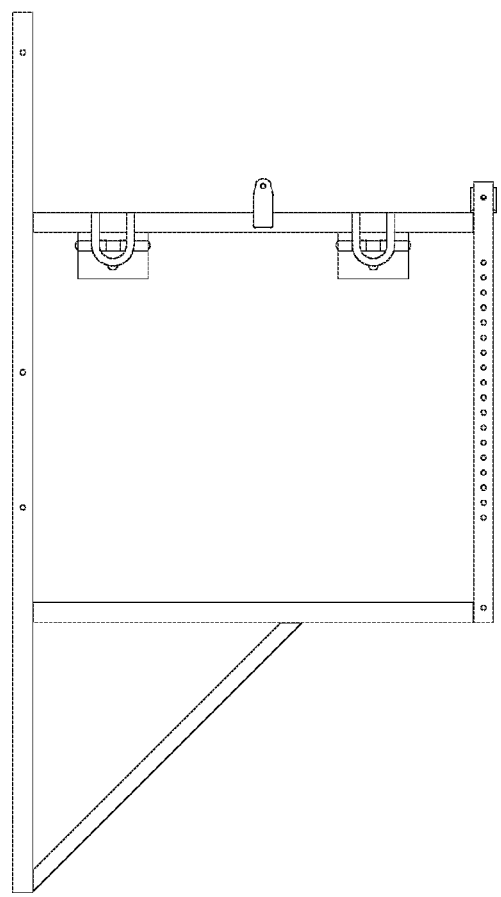

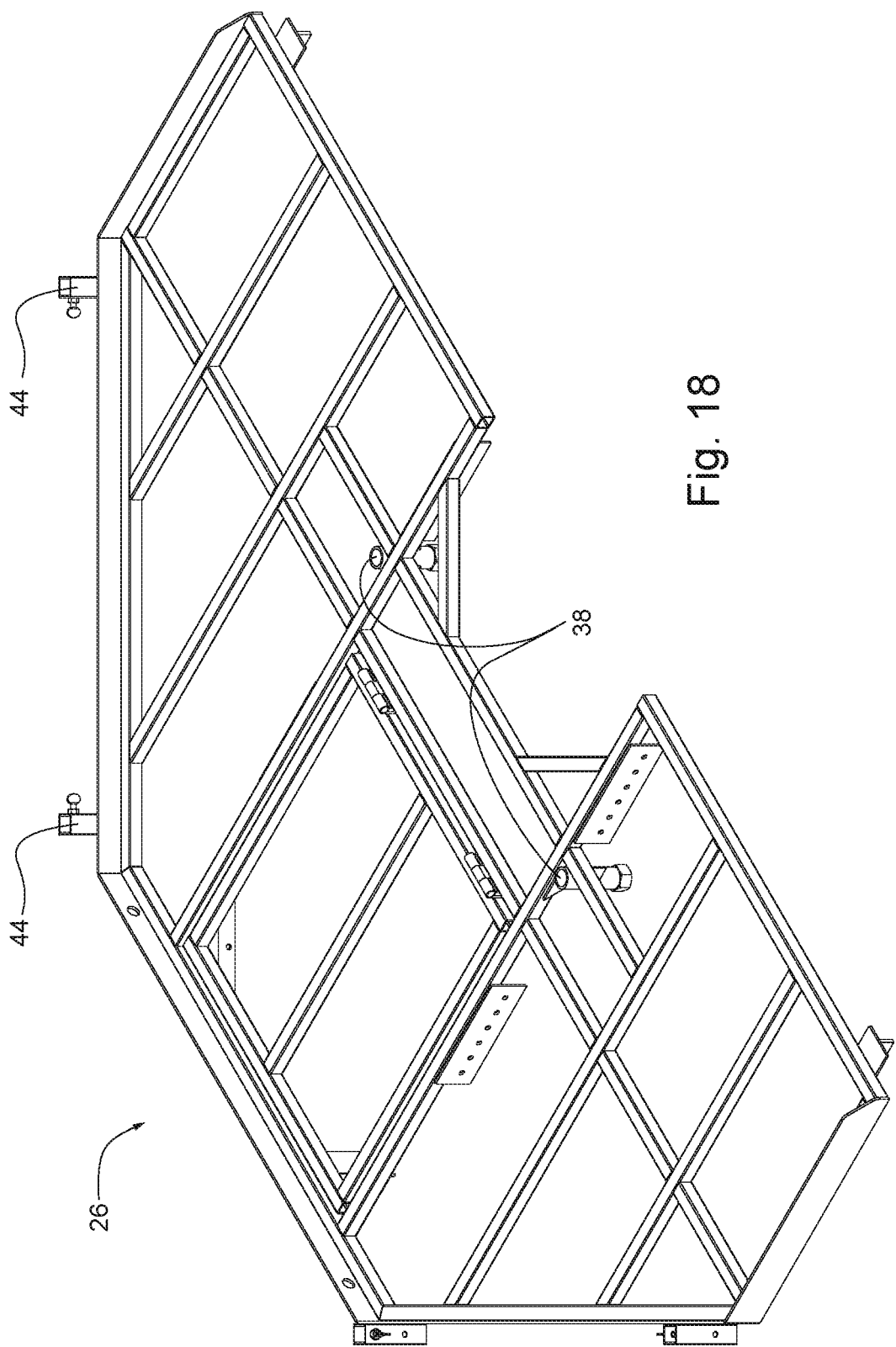

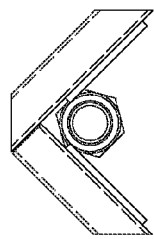
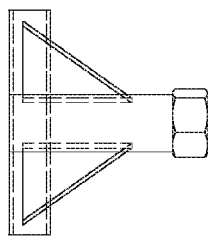
Fig. 21
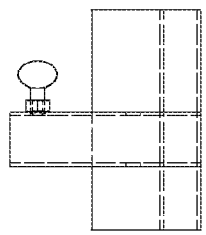
Fig. 20
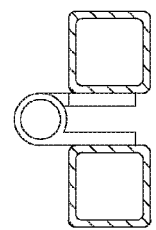
Fig. 22
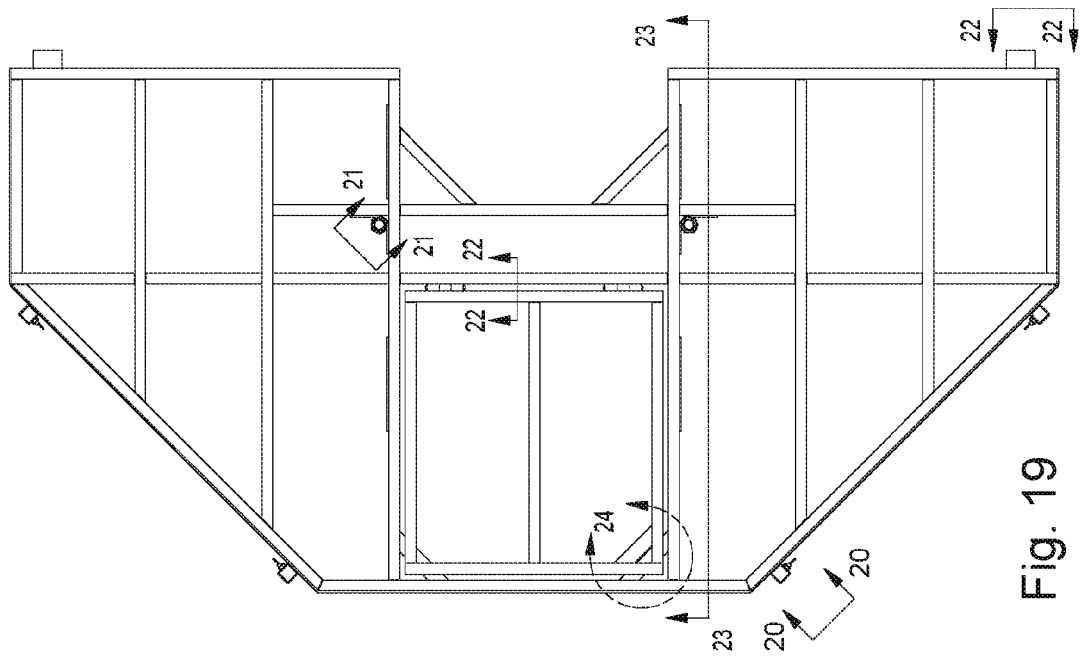
Fig. 19

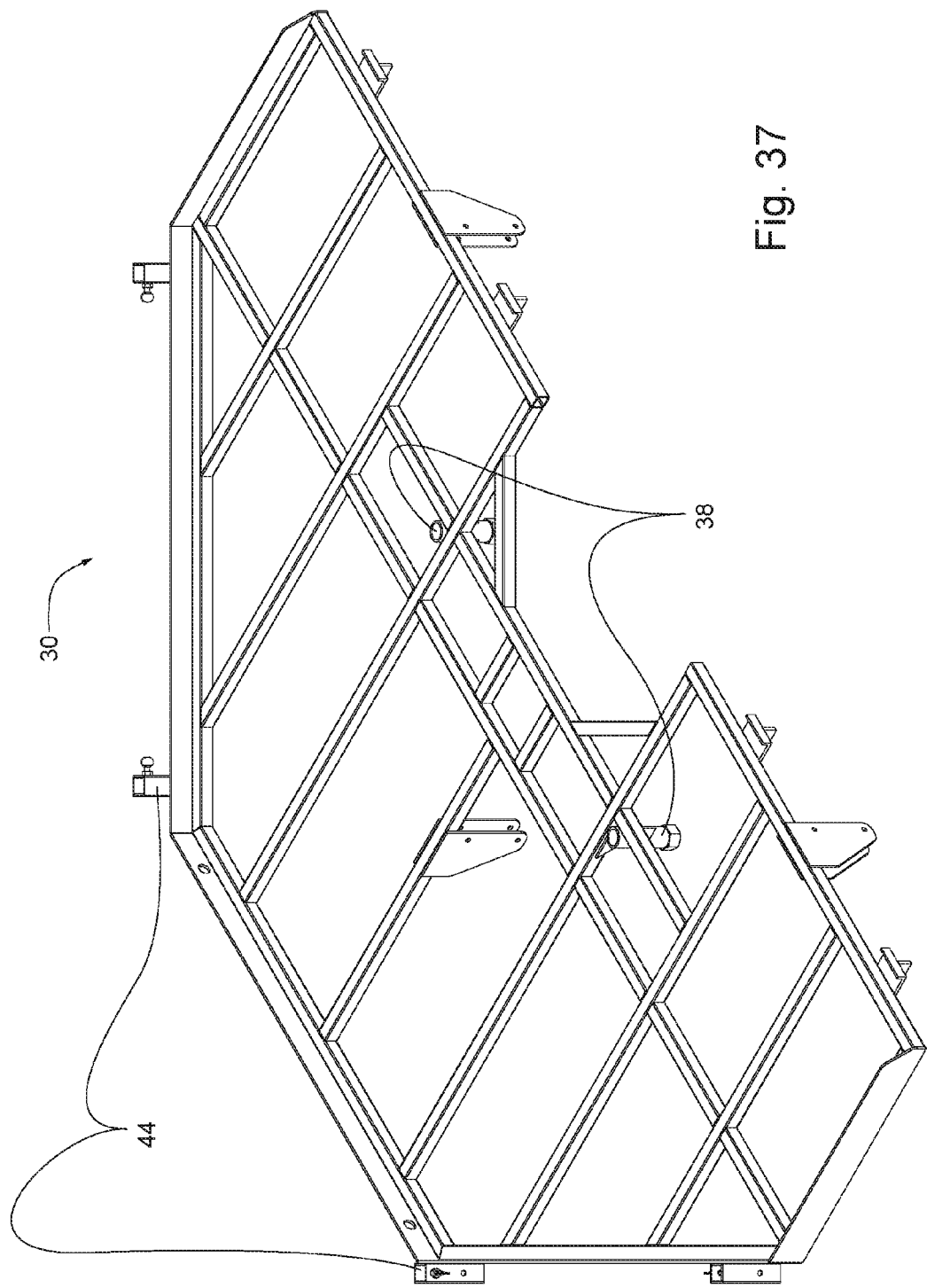

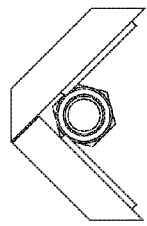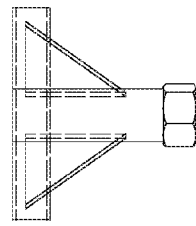
Fig. 40
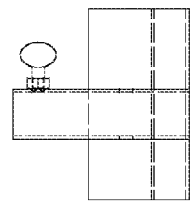
Fig. 39
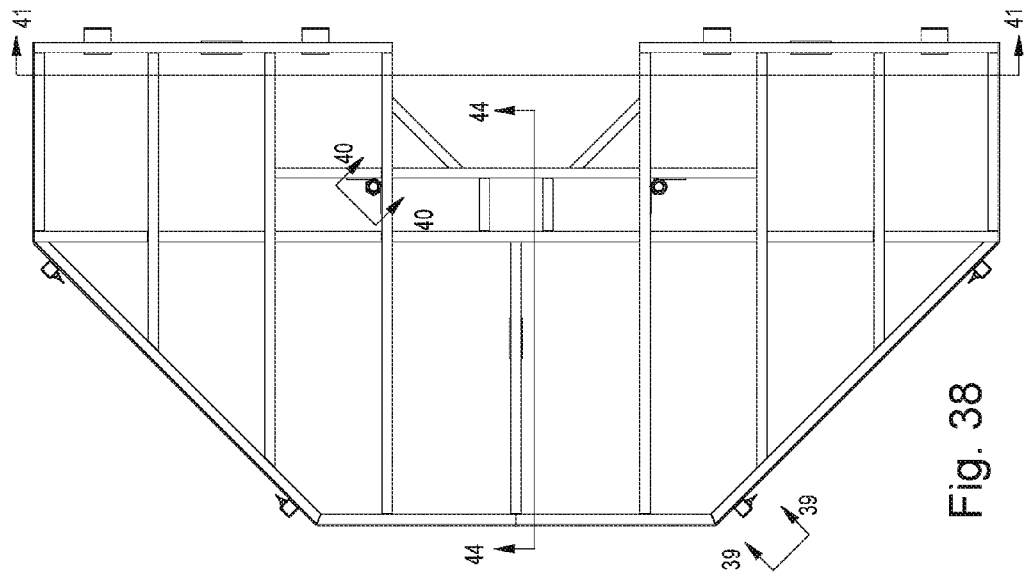
Fig. 38

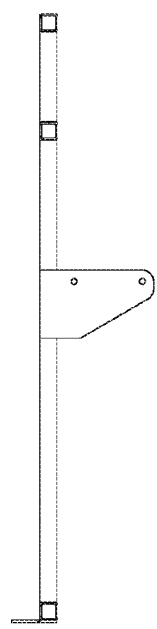
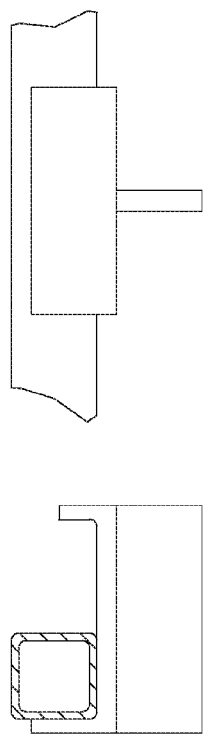
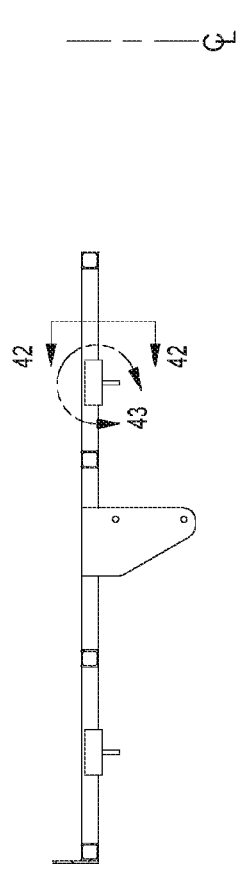

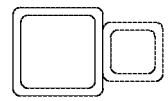
Fig. 48
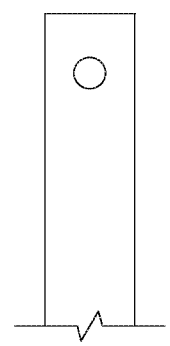
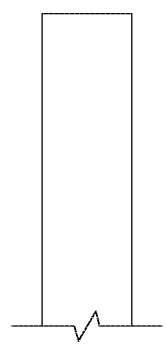
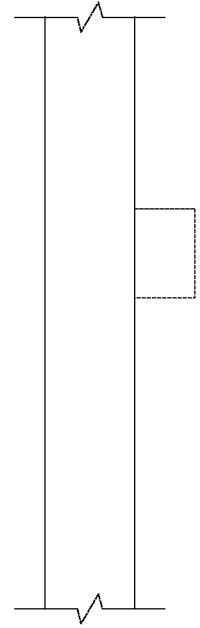
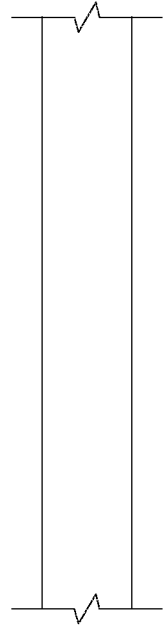
Fig. 47
Fig. 46
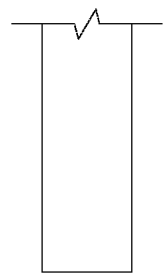
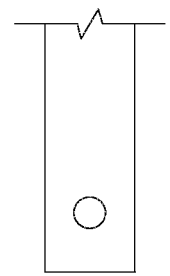

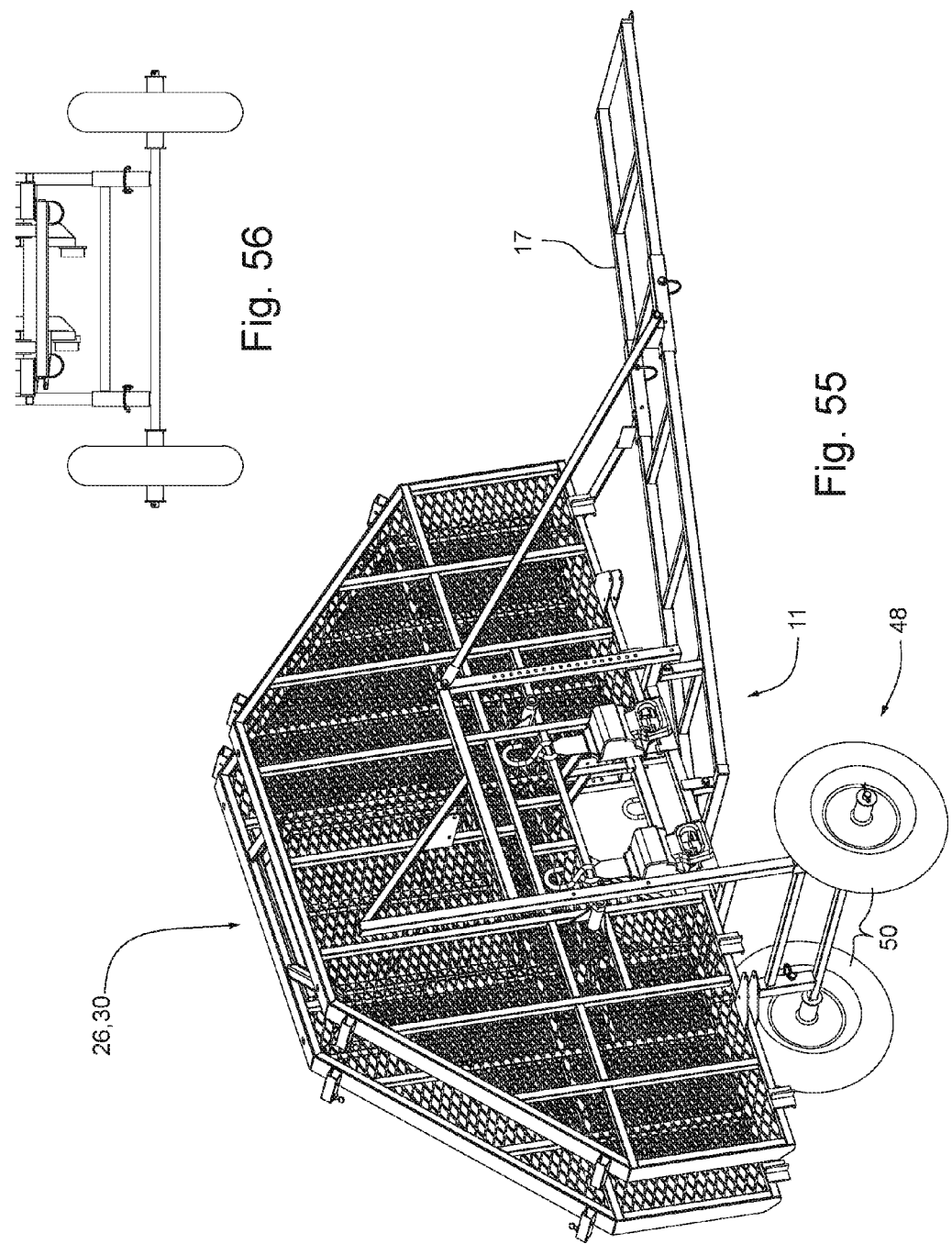

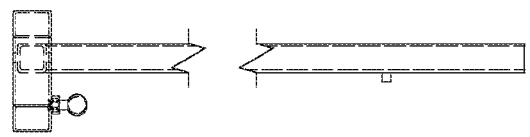
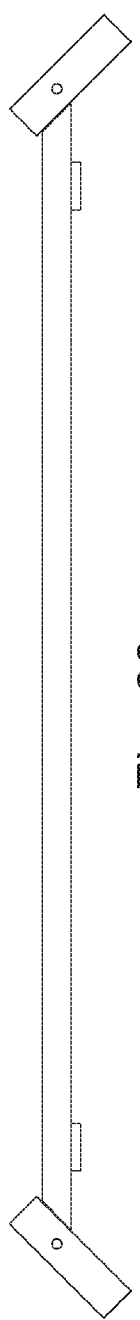
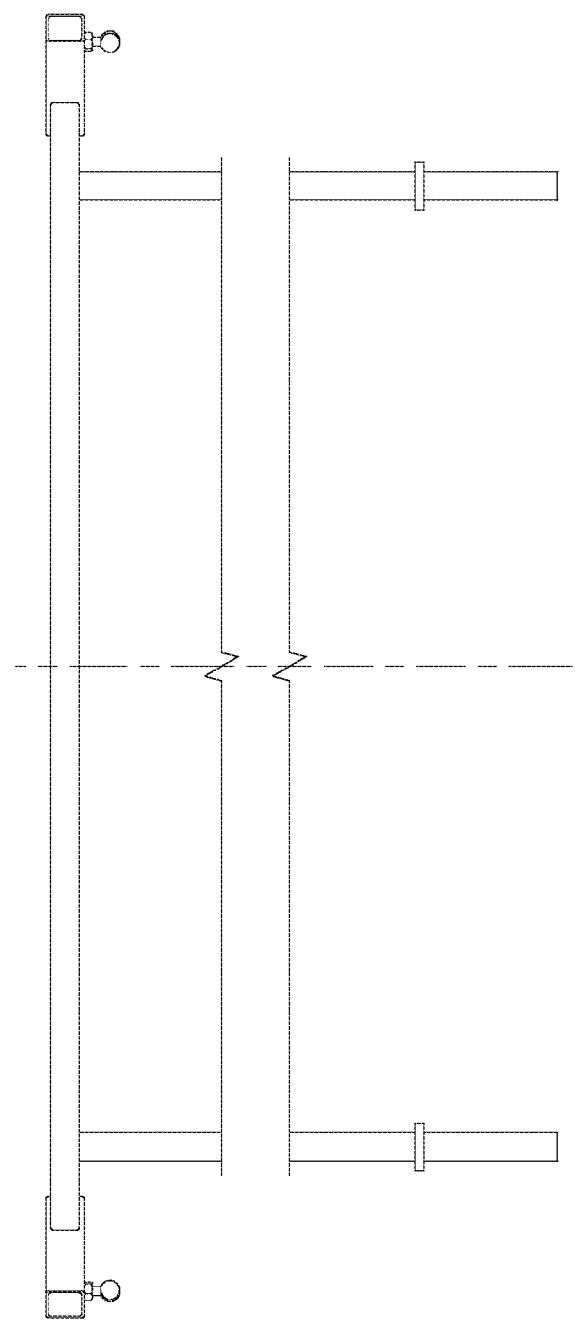
Fig. 67
Fig. 66
Fig. 65

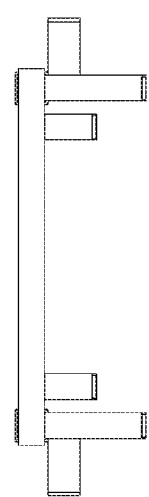
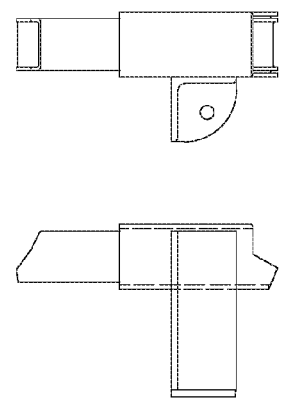
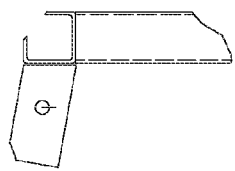
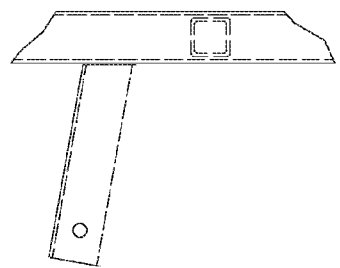
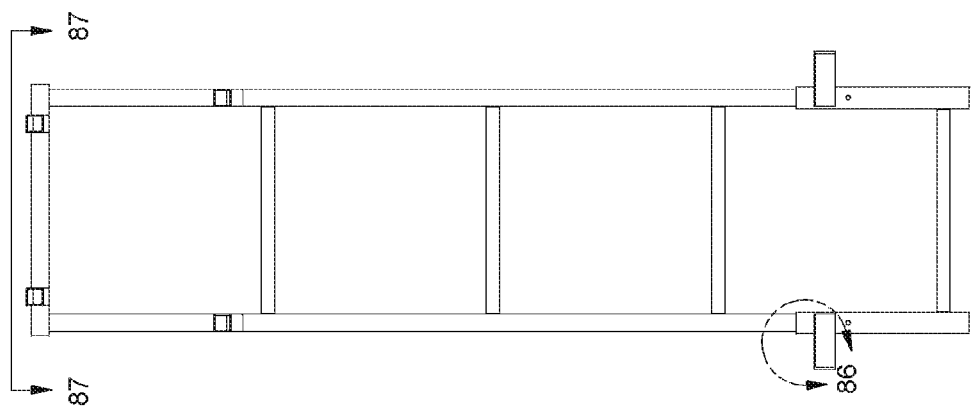

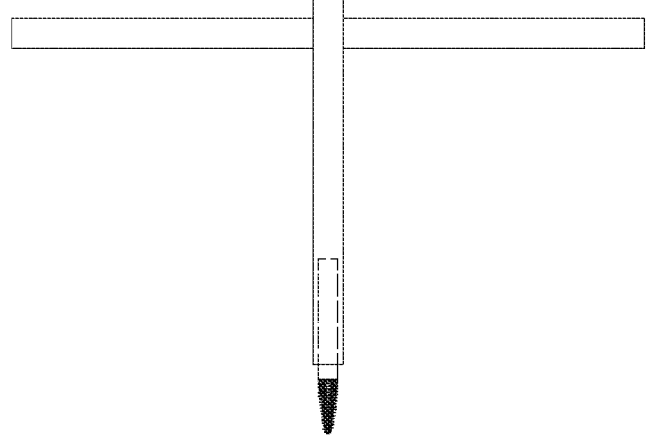
Fig. 94
Fig. 95

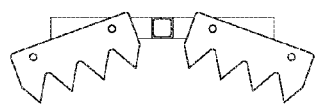
Fig. 114
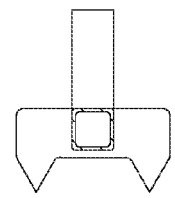
Fig. 115
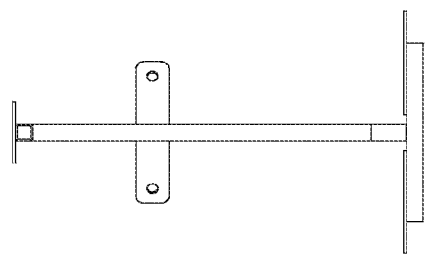
Fig. 113
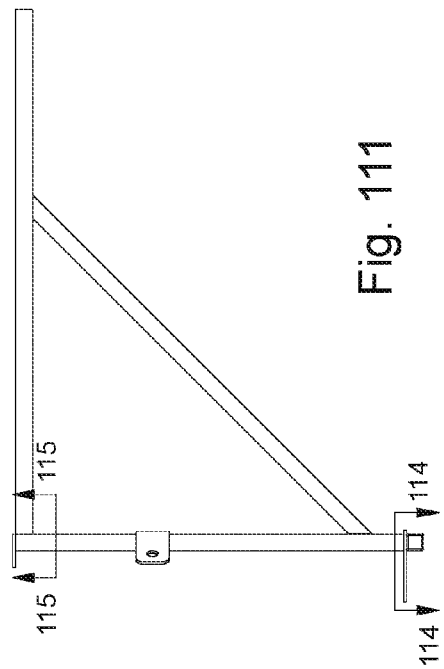
Fig. 110
Fig. 111
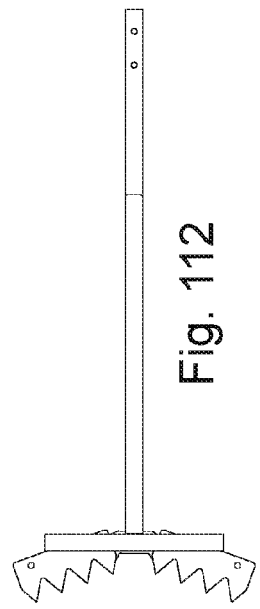
Fig. 112

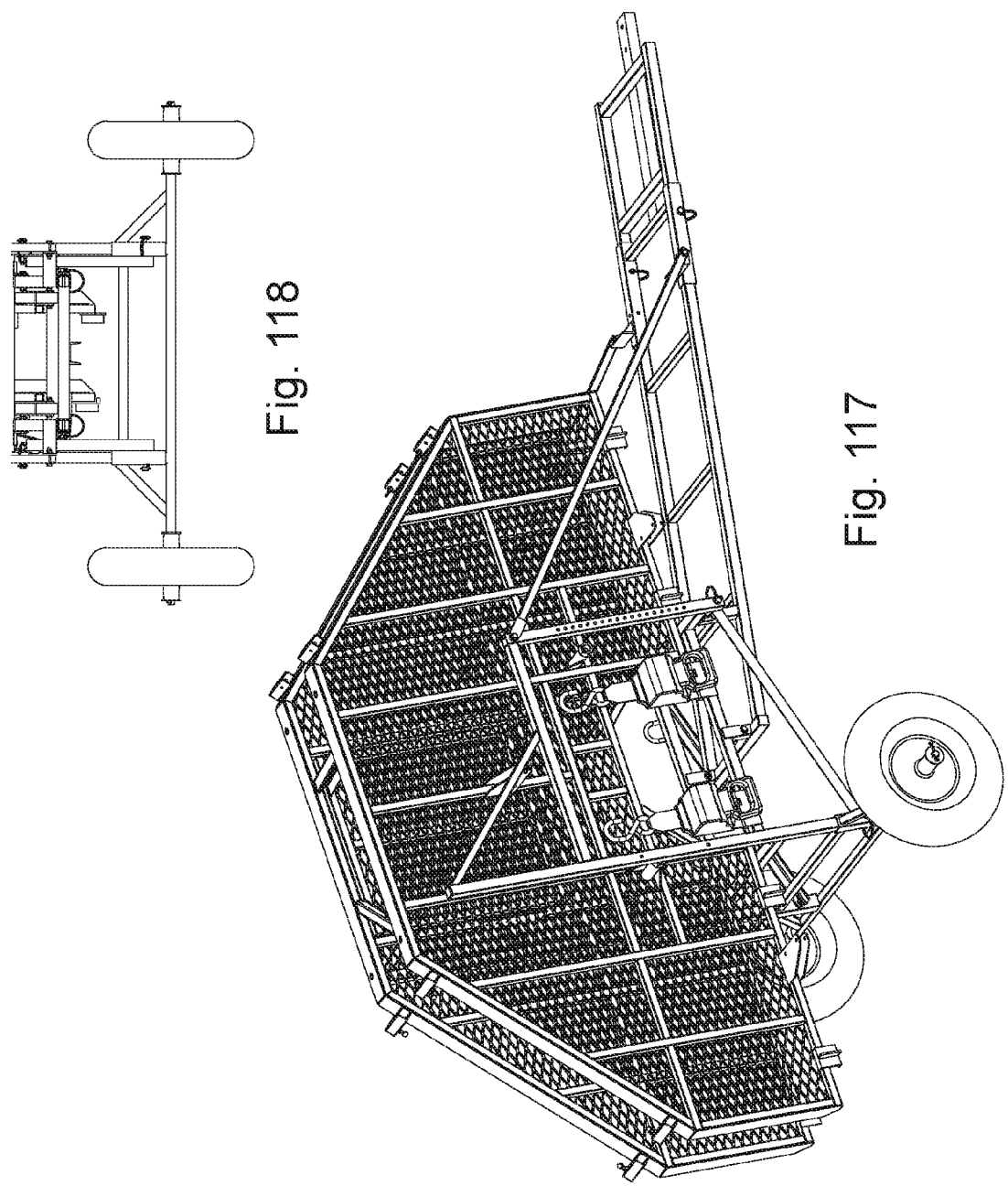

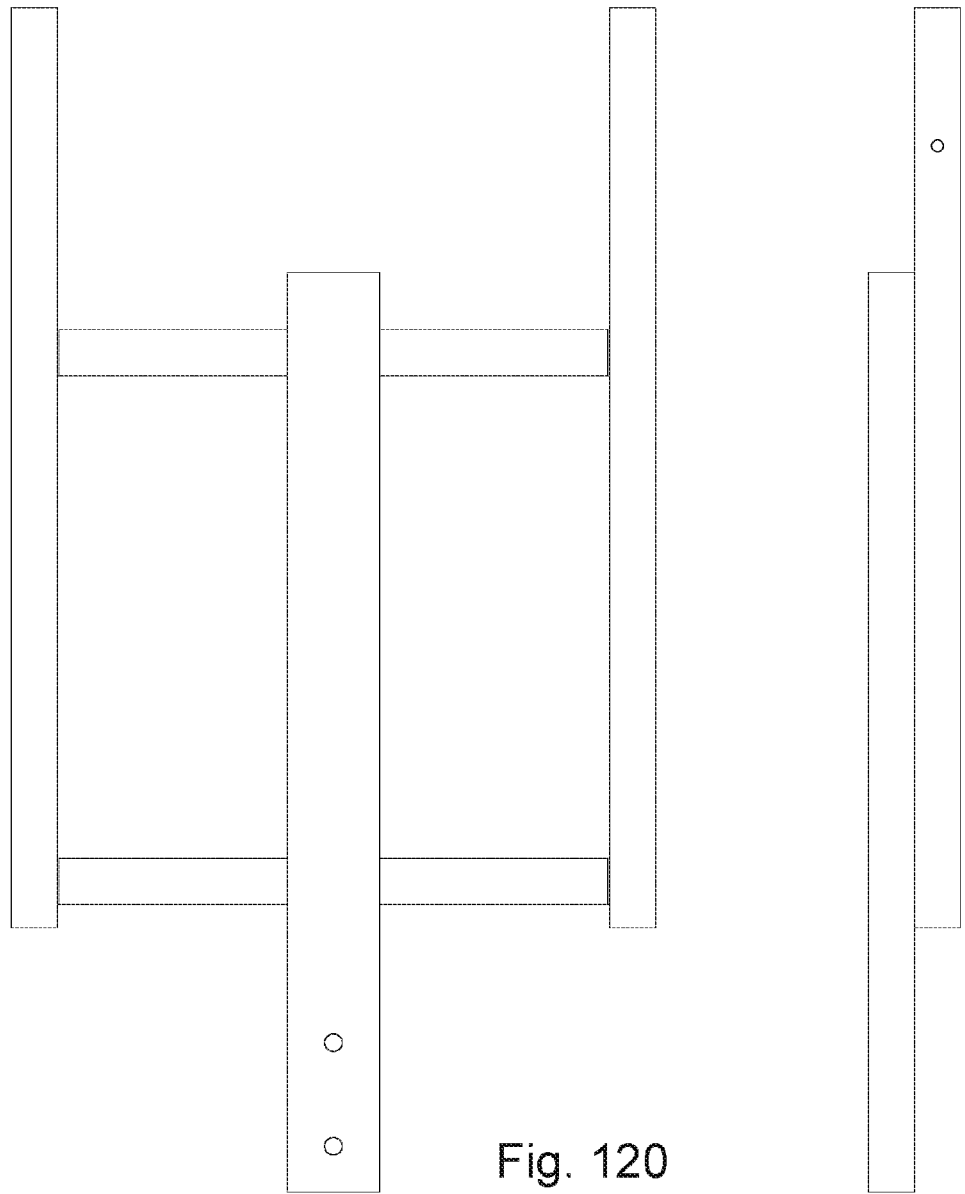
Fig. 120
Fig. 122
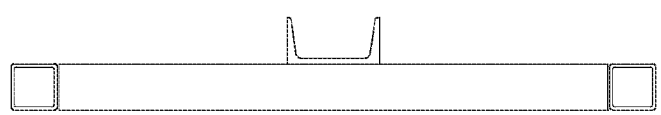
Fig. 121

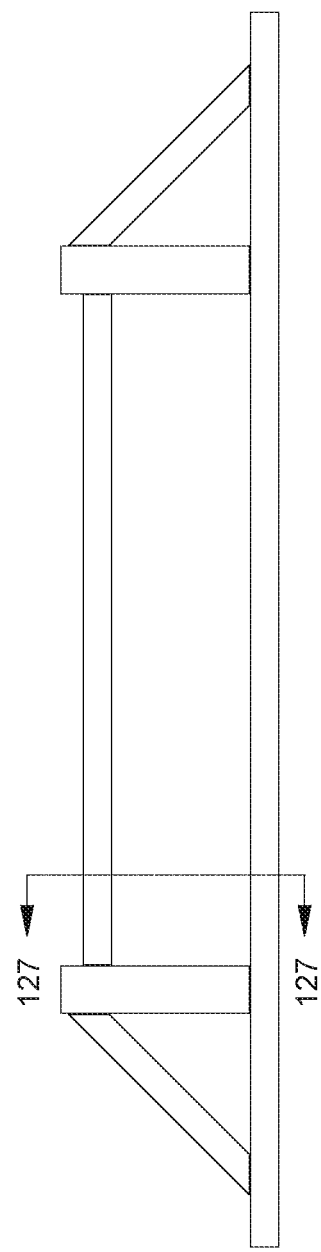
Fig. 125
Fig. 126
Fig. 127

OCTAGON PORTABLE TREE PLATFORM

CROSS-REFERENCES TO RELATED APPLICATIONS

This application claims the benefit of U.S. Provisional Patent Application No. 61/993,591, filed May 15, 2014, the entire content of which is herein incorporated by reference.

BACKGROUND

Traditional portable hunting platforms (stands) allow for only a limited site view and with a maximum occupancy of 2 persons. These platforms are cramped and do not provide for maneuverability around the tree and free personal space from the other occupant. Securement of these platforms has also been an issue with mediocre ways to secure the platforms to a tree. Tree size diameter also limits where these stands can be placed. Lastly, moving these platforms to and from the site of set up can be cumbersome and problematic due to the limited carrying options.

Therefore, a need exists for novel portable hunting platforms and stands. A further need exists for novel portable hunting platforms and stands that are not cramped, but provide for maneuverability around the tree and free personal space from the other occupant. There also exists another need for novel portable hunting platforms and stands that securely attach to trees and other vertical structures.

BRIEF SUMMARY OF THE INVENTION

The present invention seeks to provide a solution to the problem(s) by providing a platform that can give one or more users an unobstructed 360 degree view and maneuverability around a tree. The present invention seeks to be used on various tree sizes and uses a detachable wheel section to easily transport the platform to and from the site of set up. In preferred embodiments, the platform comprises a base piece that leans on and secures to the tree using one or more retractable ratchet straps and a system comprising a plurality of separate "biters" that grip and secure the platform to the tree from four different directions thus making it very stable.

The main lower "biter" may slide on the base frame allowing it to be able to adjust in order to level the platform when installed on a leaning tree. The main upper "biter" is stationary on the frame and is used for added stability.

The floor of the platform may be made up of two detachable pieces (entry platform floor piece and opposite platform floor piece). The entry platform floor piece attaches to the base piece with wire locking pins on a series of holes. The opposite platform floor piece attaches to the entry floor piece preferably using interlocking "U" shaped steel channels. It then rests on top of the base frame.

The platform may have four different positions for removable seat pieces and may have an optional detachable shooting rail. The platform may be set up at multiple different heights that can be accessed by using the additional detachable main ladder pieces and a footer piece to the ladder. A bottom main ladder section may also have an anchor brace securement device that attaches it to the tree by either cutting into the tree with a screw end or use another preferable attachment method and then pinned to the ladder on the opposite end using a wire locking pin. The anchor brace securement device may also use a sliding pin-hole system that allows for adjustment for different distances.

Finally, the entire device may load in the base and one or more locking pin holes may allow for the attachment of a two wheeled detachable piece in order to move the platform easily to and from the site.

BRIEF DESCRIPTION OF THE DRAWINGS

FIG. 7 depicts a perspective view of an Octagon Platform Assembly from above according to various embodiments described herein.

FIGS. 13, 14 and 15 illustrate a side view of an example of a platform assembly according to various embodiments described herein.

FIG. 18 shows an example of a main floor platform section according to various embodiments described herein.

FIGS. 19-22 show an example of a main floor platform weldment section according to various embodiments described herein.

FIG. 37 depicts an example of the opposite floor platform section according to various embodiments described herein.

FIGS. 38-40 depict an example of the opposite floor platform weldment section according to various embodiments described herein.

FIGS. 41-44 depict a detailed side view of an example of the opposite floor platform section according to various embodiments described herein.

FIGS. 46-48 illustrate a cantilever weldment according to various embodiments described herein.

FIGS. 55 and 56 depict a base frame assembly "basket view" set up on the detachable wheels according to various embodiments described herein.

FIGS. 65-67 illustrate a detailed view of a "shooting rail" section according to various embodiments described herein.

FIGS. 82-87 show a detailed view of an example of a removable platform ladder section according to various embodiments described herein.

FIGS. 94 and 95 show a detailed view of an example of a ladder anchor brace weldment according to various embodiments described herein.

FIGS. 110-115 show a detailed view of a "hoist" weldment according to various embodiments described herein.

FIGS. 117 and 118 illustrate a view of the "ATV" base wheel assembly attached to the base frame "basket" according to various embodiments described herein.

FIGS. 120-122 illustrate a detailed view of the "ATV" tow hitch assembly according to various embodiments described herein.

FIGS. 125-127 illustrate an example of a detailed view of the "ATV" trailer weldment according to various embodiments described herein.

DETAILED DESCRIPTION AND BEST MODE OF IMPLEMENTATION

Figure 1:
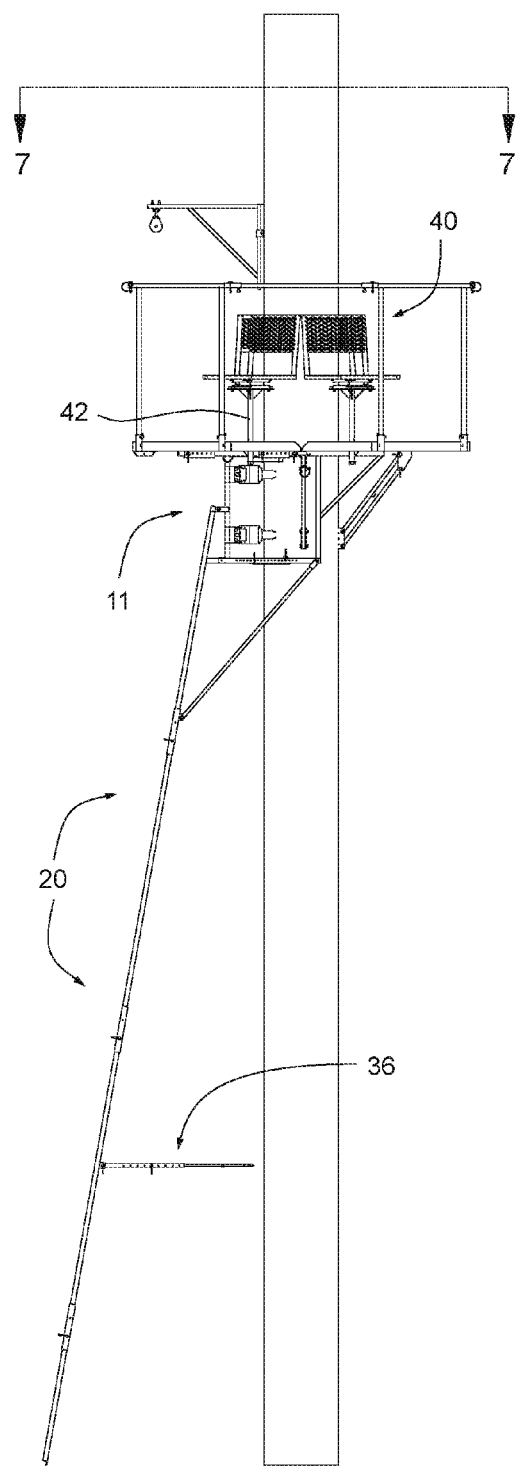
FIGS. 1 and 2 depict a perspective view of an Octagon Platform Assembly set up on tree at 18.4' according to various embodiments described herein.
Figure 2:
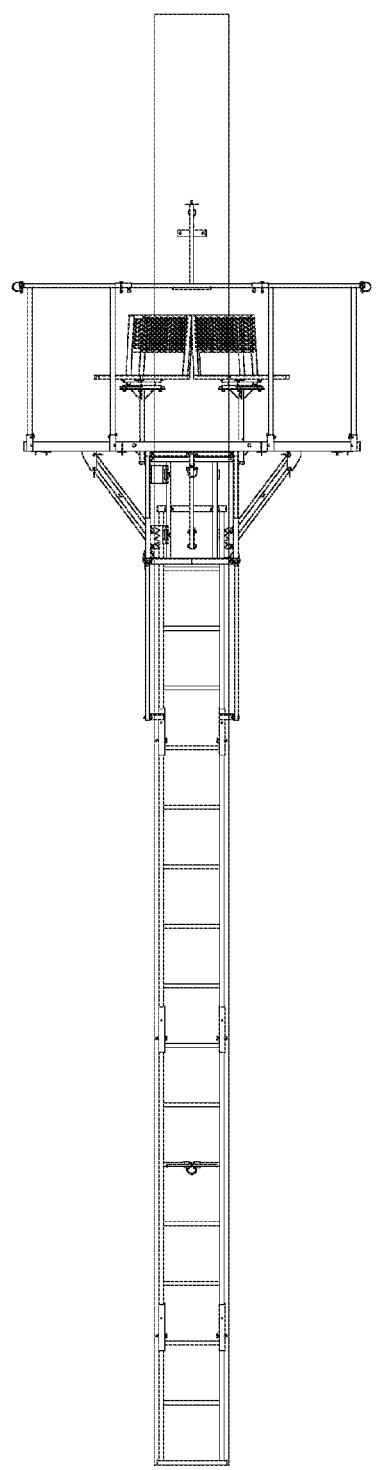
Figure 3:
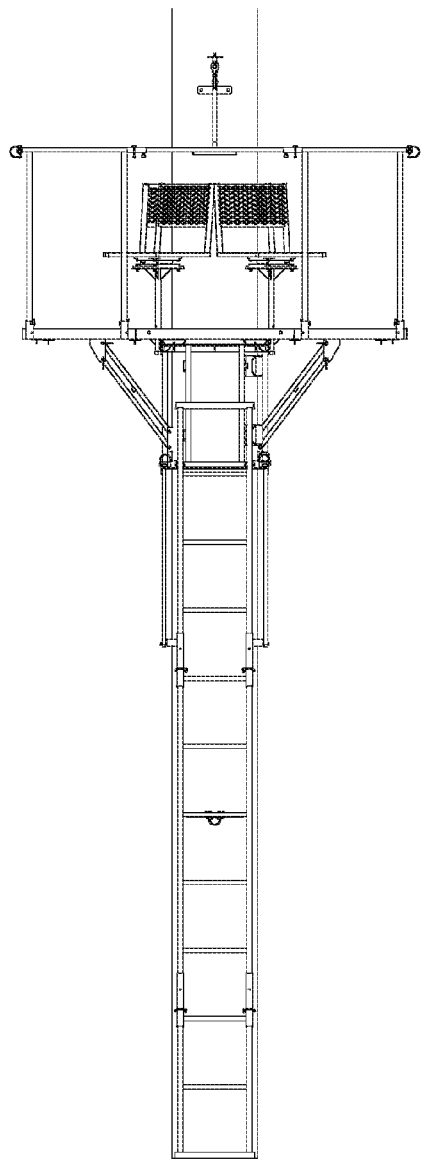
FIGS. 3 and 4 depict a perspective view of an Octagon Platform Assembly set up on tree at 13' according to various embodiments described herein.
Figure 4:
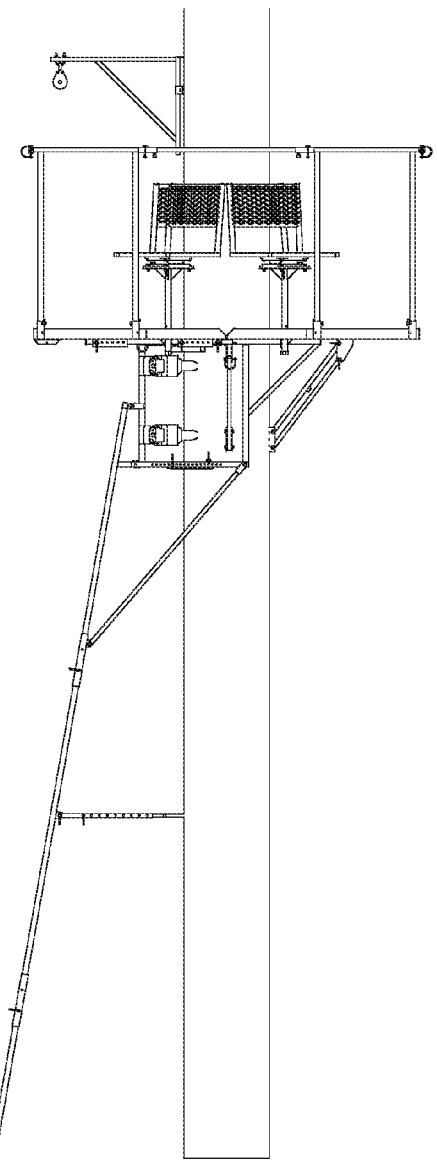
Figure 6:
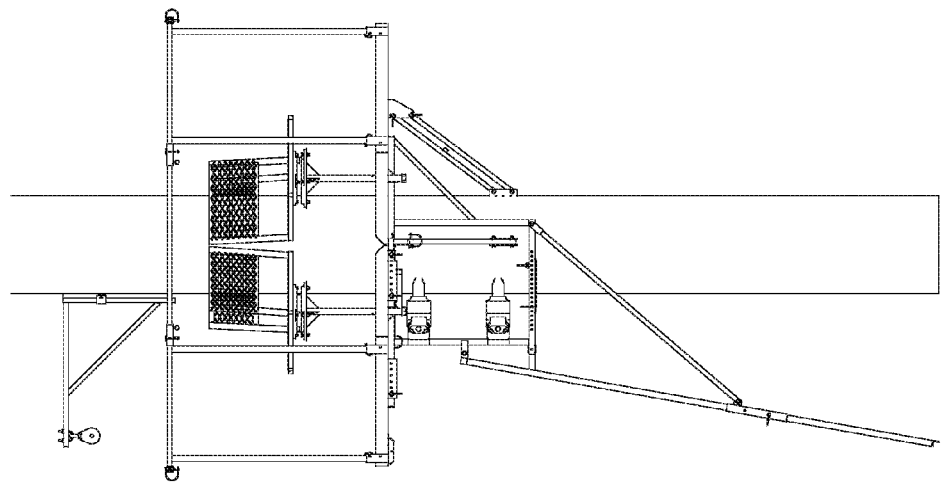
FIGS. 5 and 6 depict a perspective view of an Octagon Platform Assembly set up on tree at 7'8" according to various embodiments described herein.
Figure 5:
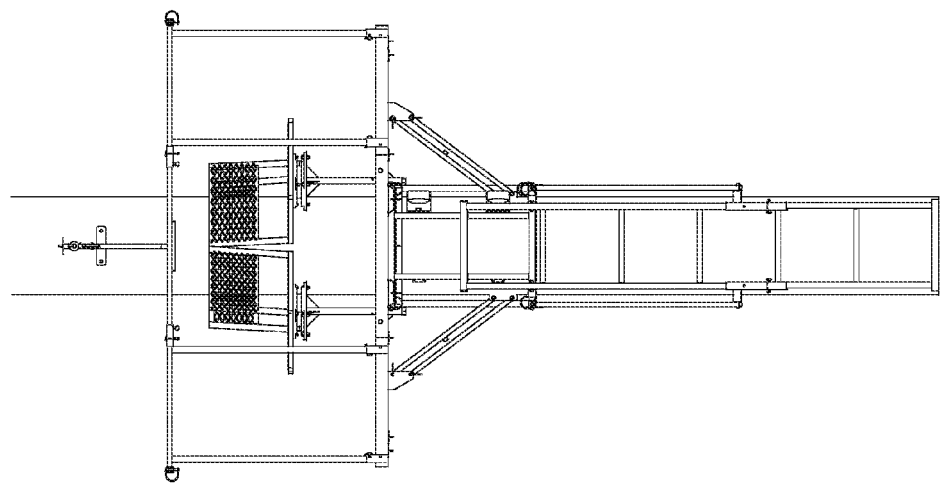
Figure 8:
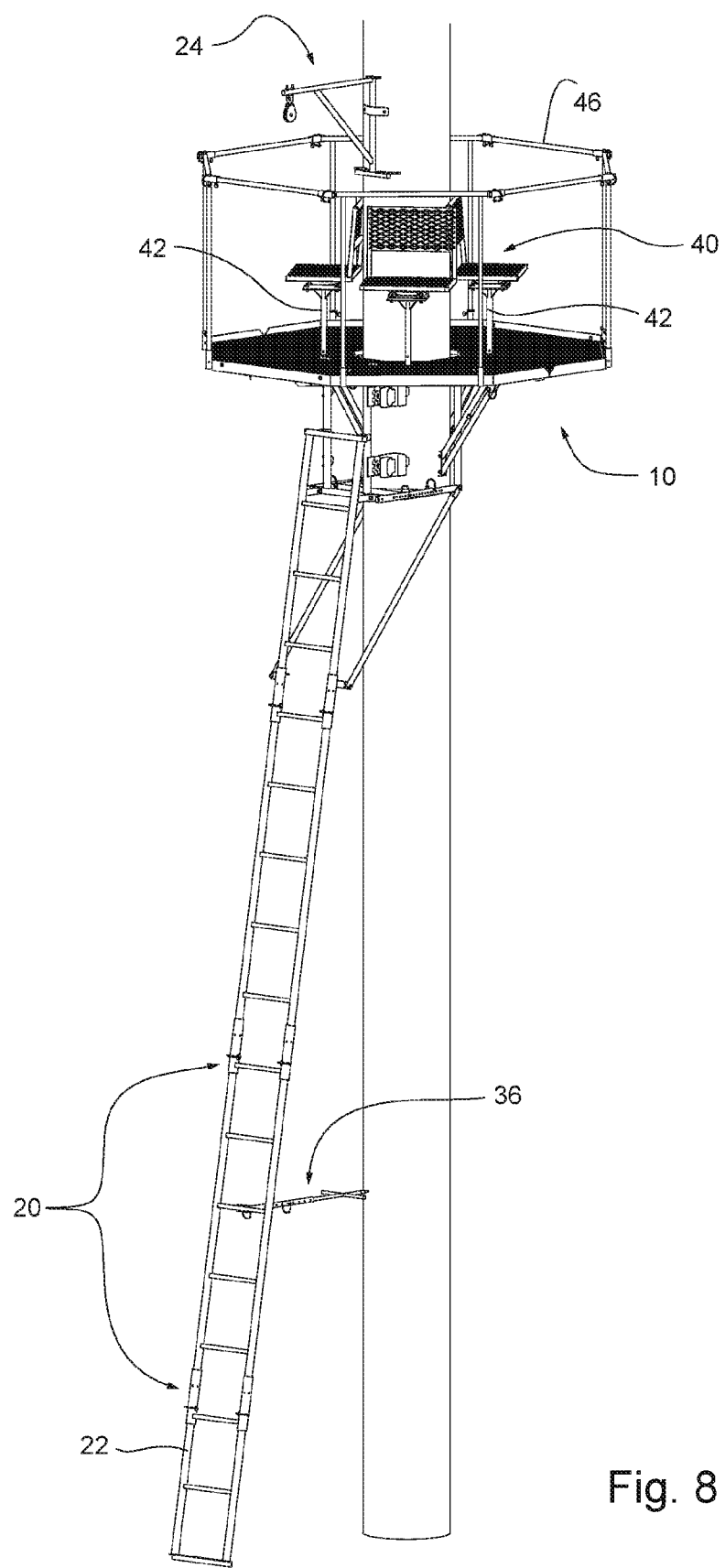
FIG. 8 illustrates a perspective view of an example of a platform attached to tree according to various embodiments described herein.
Figure 9:
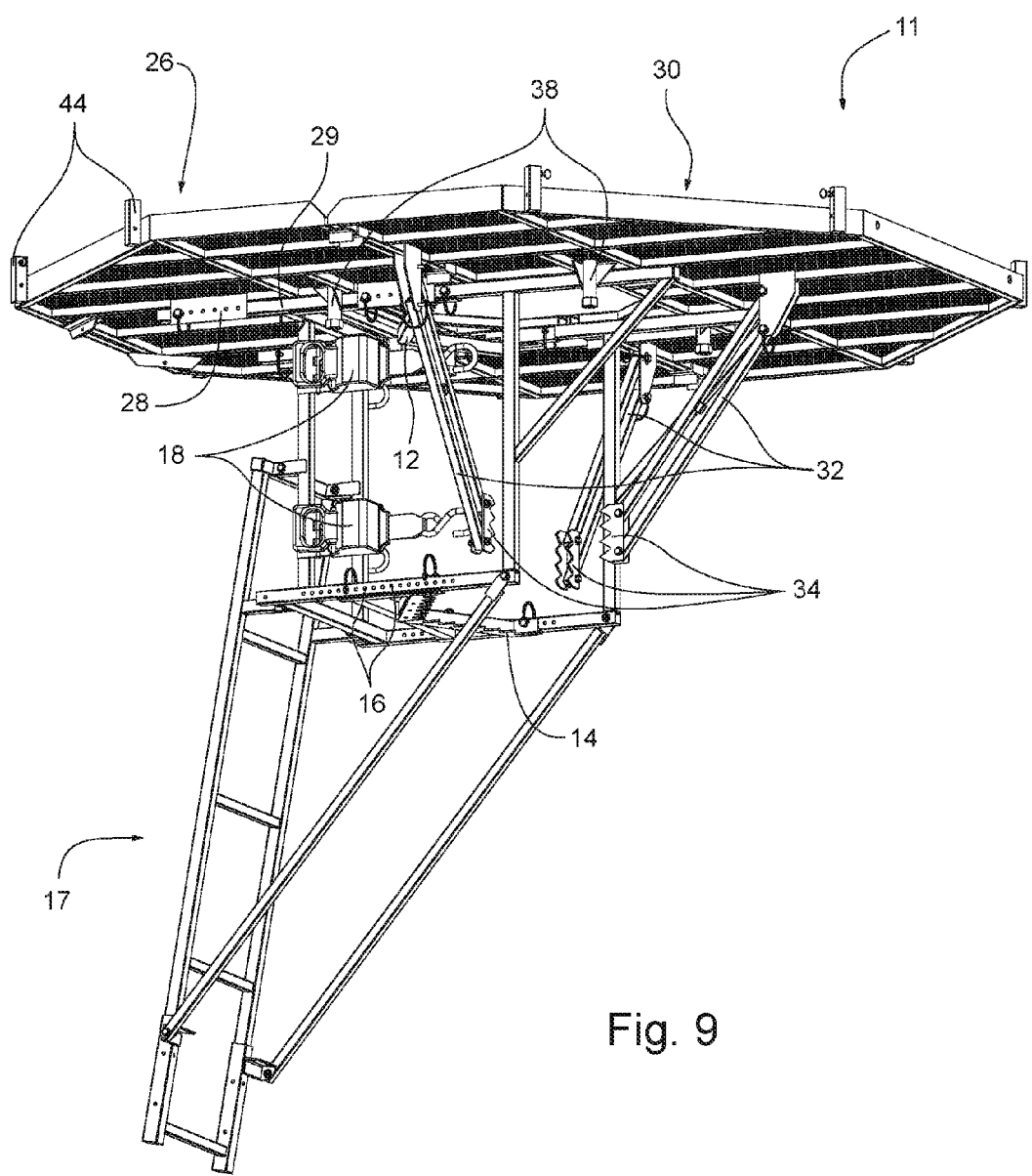
FIG. 9 illustrates a detailed view of an example of a platform assembly and base according to various embodiments described herein.
Figure 10:
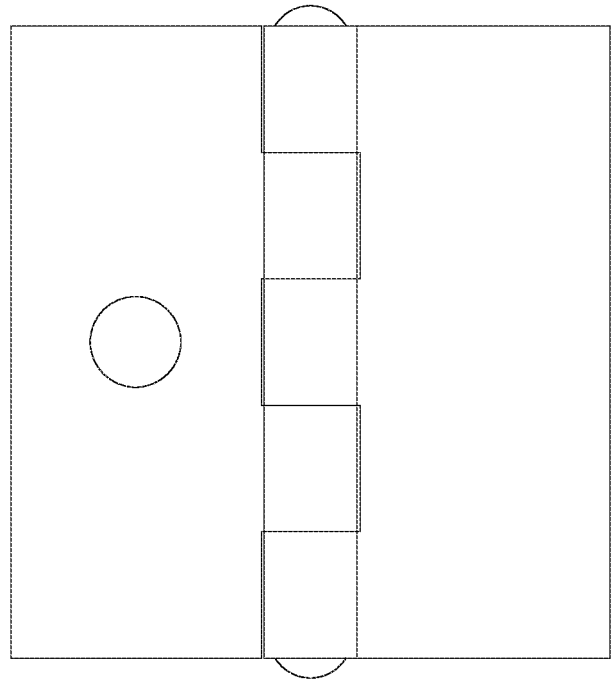
FIGS. 10 and 11 illustrate a detailed view of an example of a hinge mount assembly according to various embodiments described herein.
Figure 11:
Figure 12:
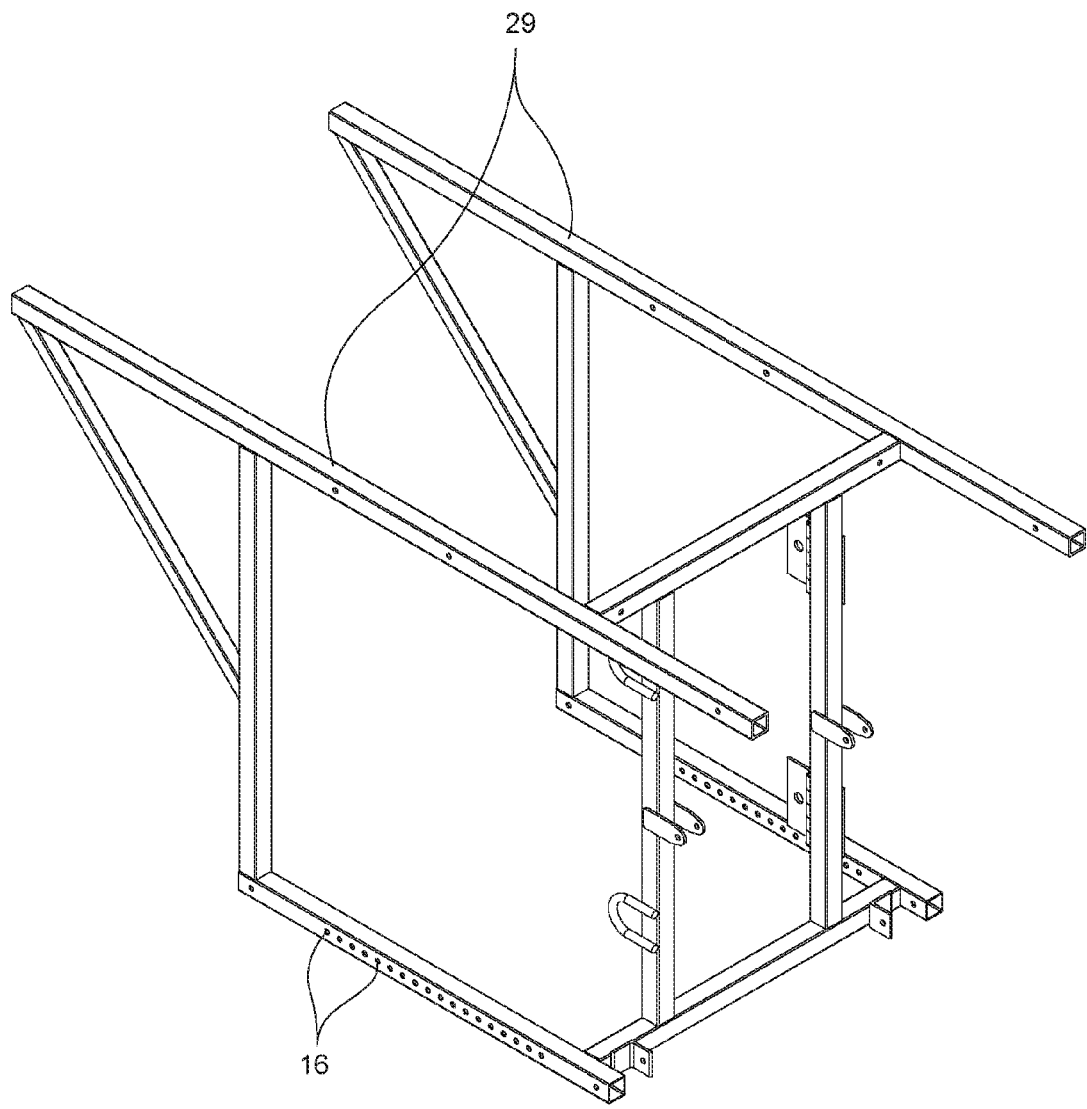
FIG. 12 illustrates a detailed view of an example of a platform base assembly according to various embodiments described herein.
Figure 16:
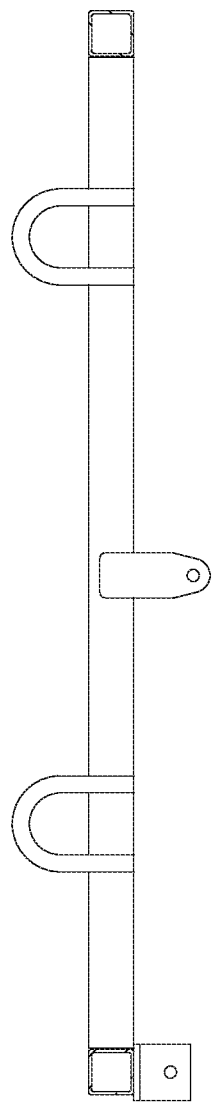
FIGS. 16 and 17 illustrate a detailed view of an example of a base hinge mounting sections according to various embodiments described herein.
Figure 17:
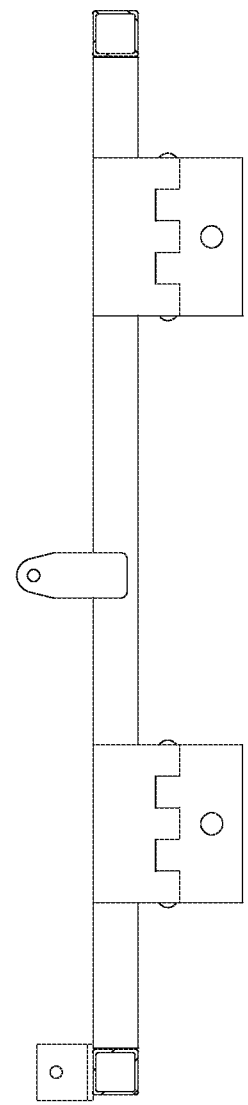
Figure 26:
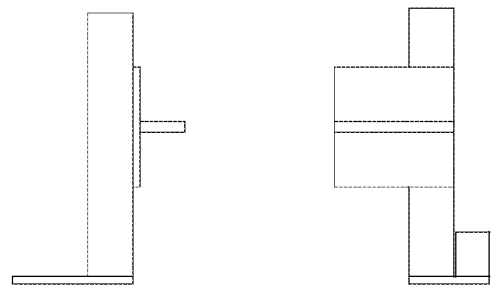
FIGS. 23-26 show a detailed side view of an example of a main floor platform section according to various embodiments described herein.
Figure 25:
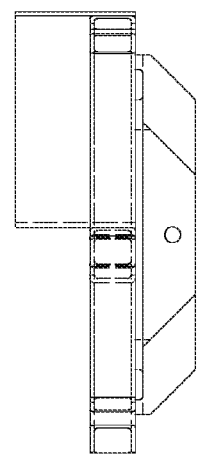
Figure 24:
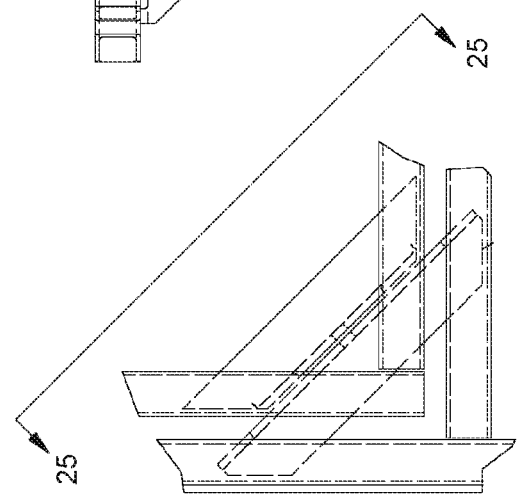
Figure 23:
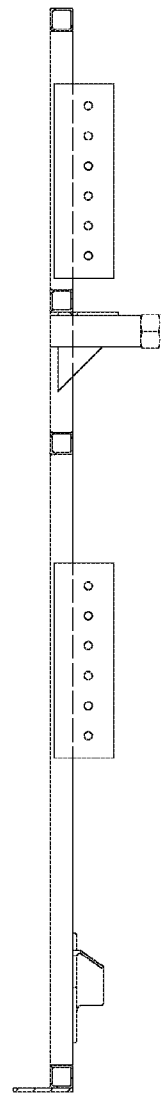
Figure 27:
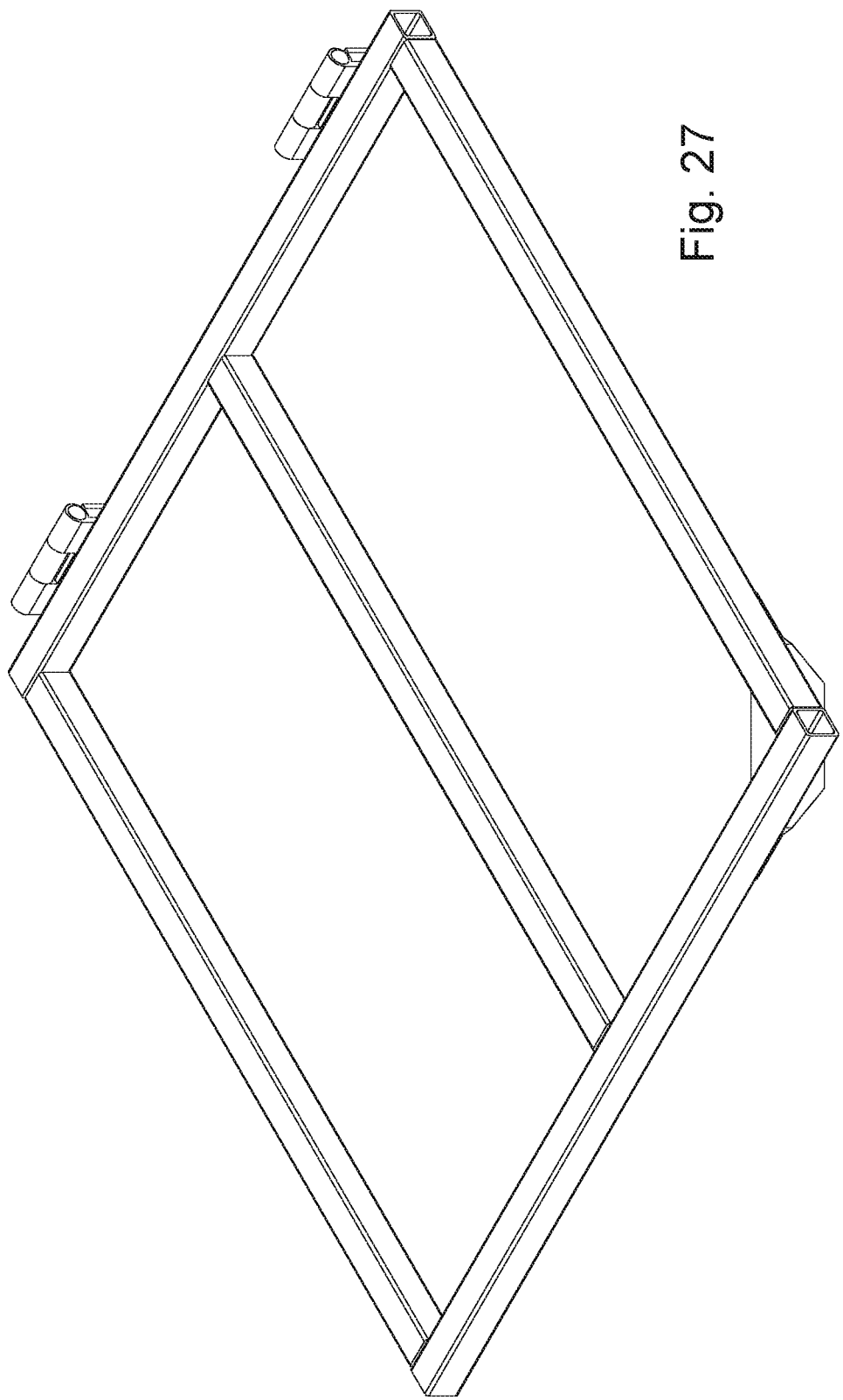
FIG. 27 shows an example of a main floor hatch section according to various embodiments described herein.
Figure 30:
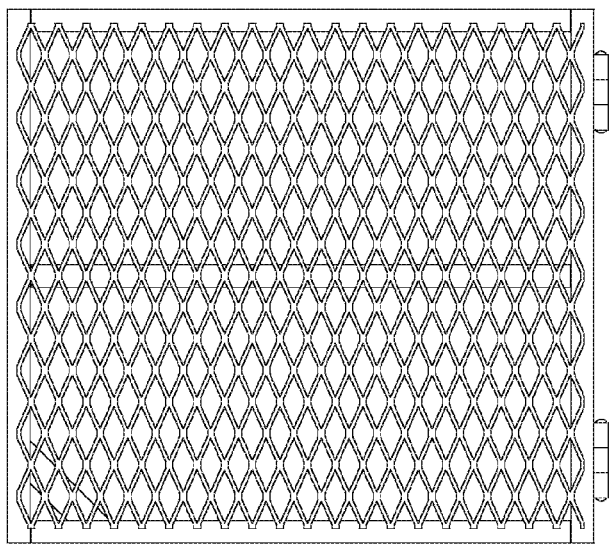
FIGS. 28-31 show an example of a main floor hatch hinged section according to various embodiments described herein.
Figure 29:
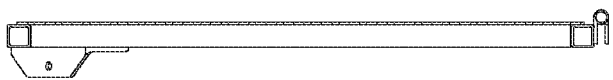
Figure 28:
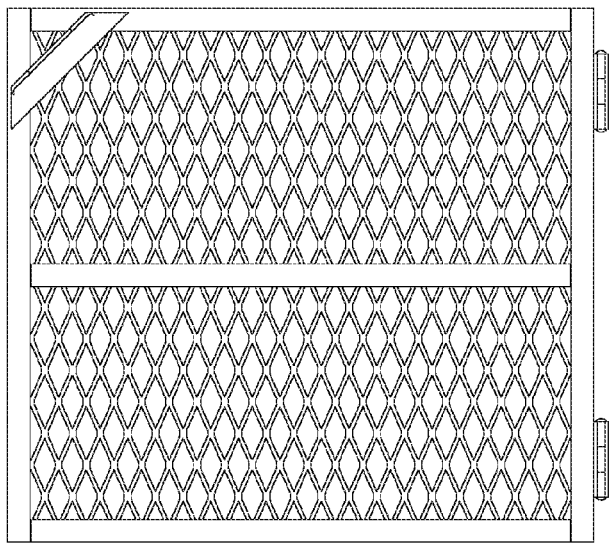
Figure 31:
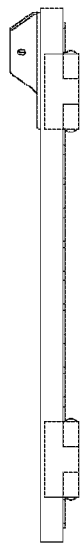
Figure 32:
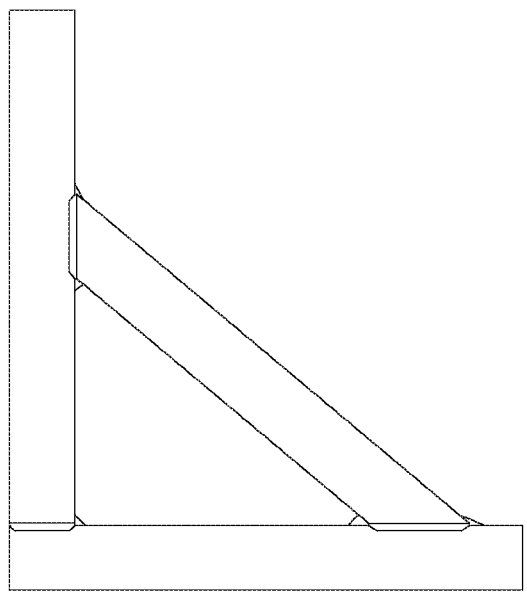
FIGS. 32 and 33 show an example of a main floor weld point section according to various embodiments described herein.
Figure 33:
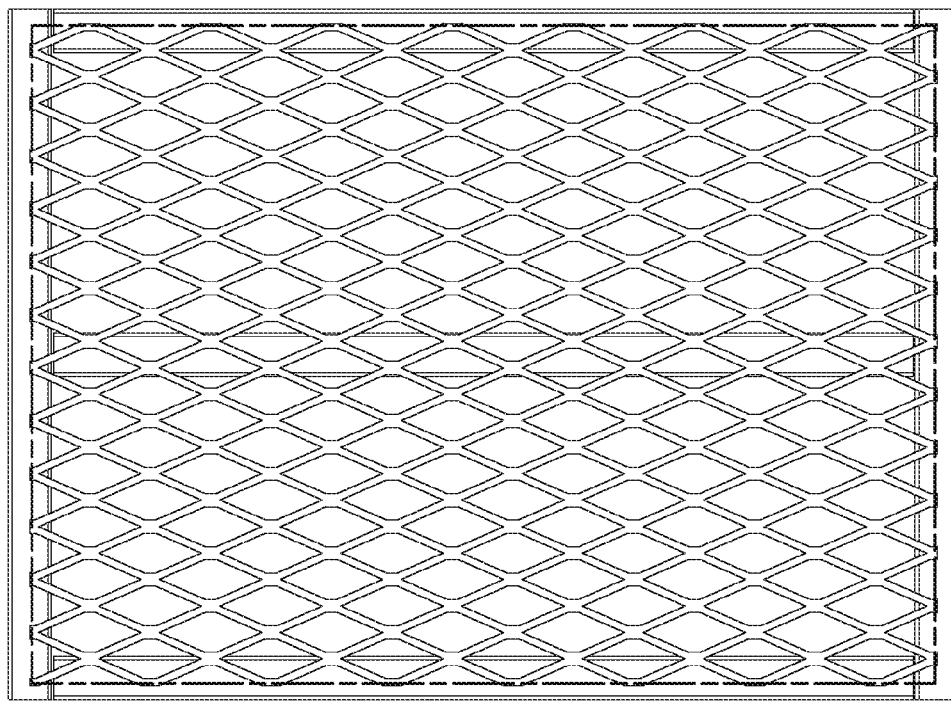
Figure 34:
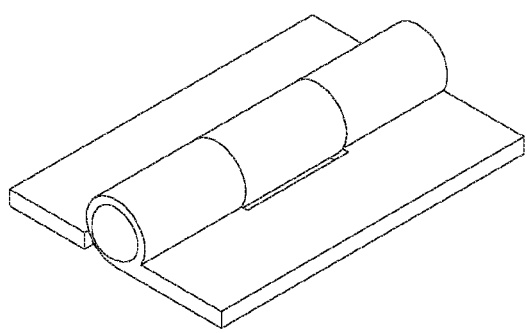
FIGS. 34-36 show an example of a hinge according to various embodiments described herein.
Figure 35:
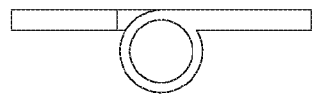
Figure 36:
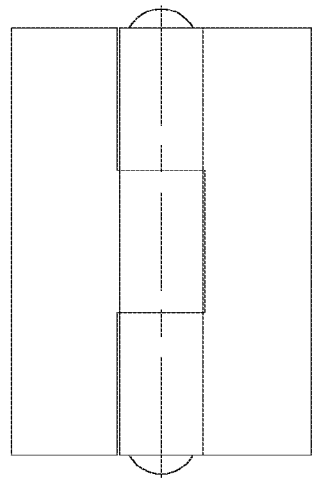
Figure 45:
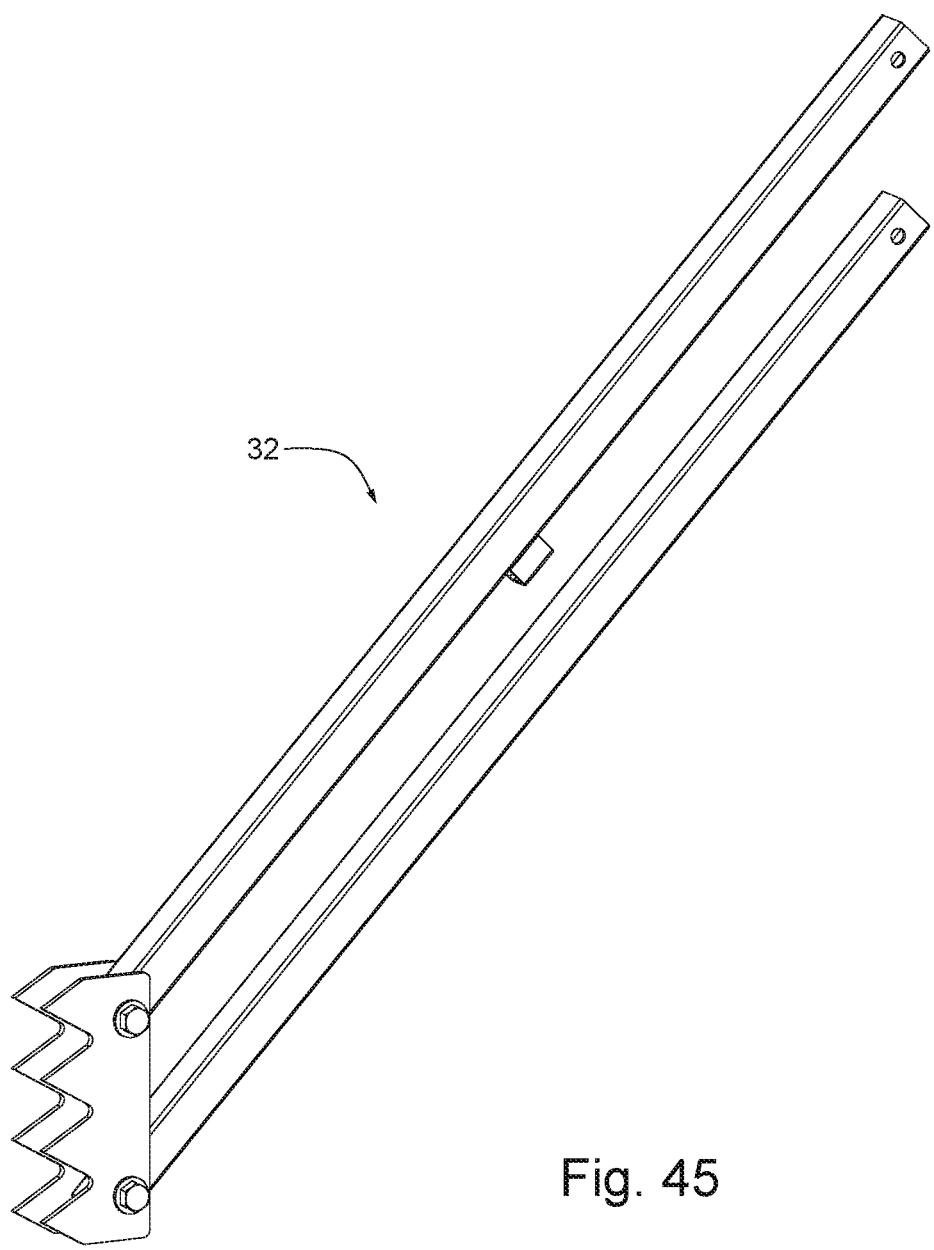
FIG. 45 illustrates a perspective view of an adjustable cantilever according to various embodiments described herein.
Figure 49:
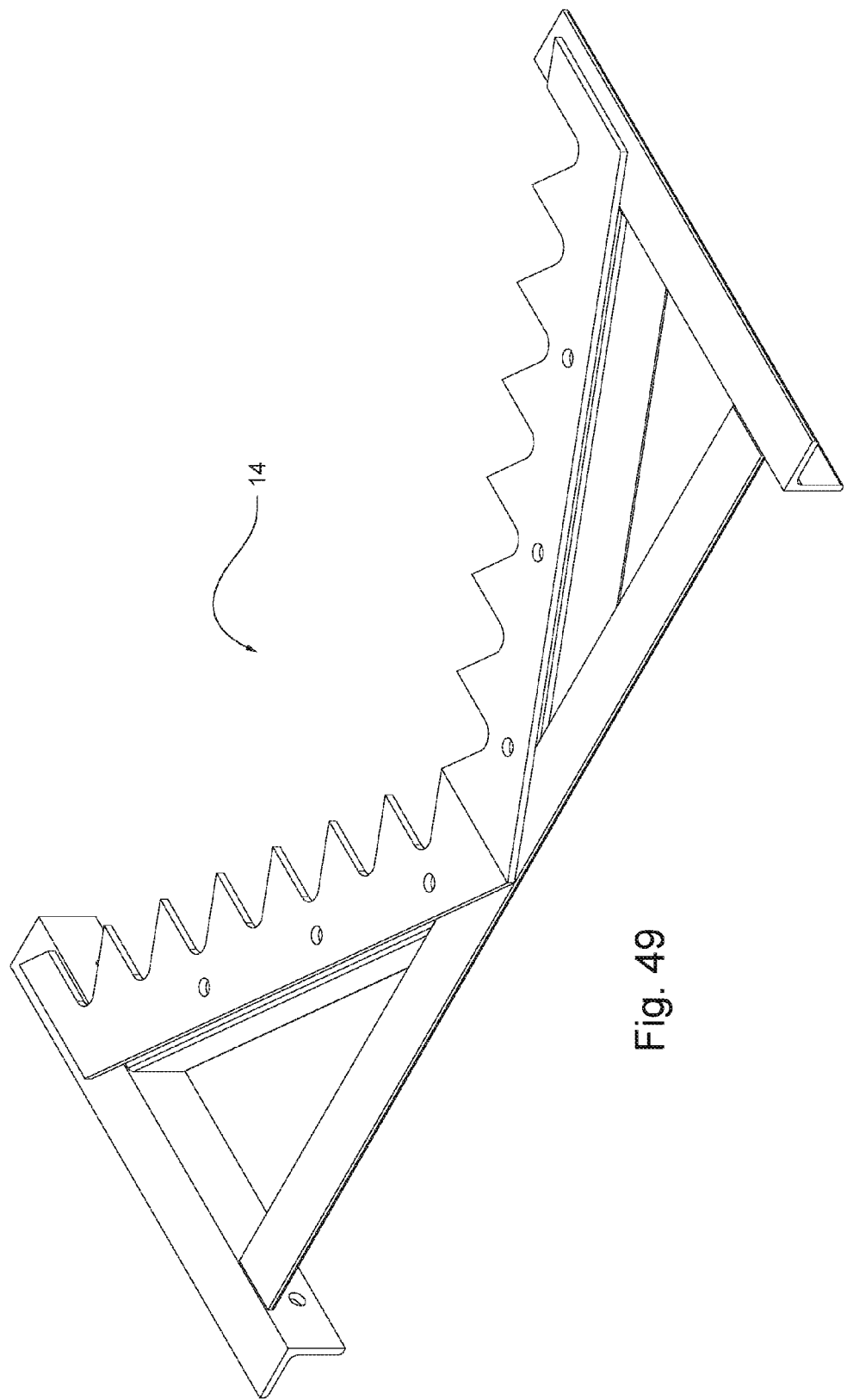
FIG. 49 shows a perspective view of a sliding adjustable lower biter assembly according to various embodiments described herein.
Figure 50:
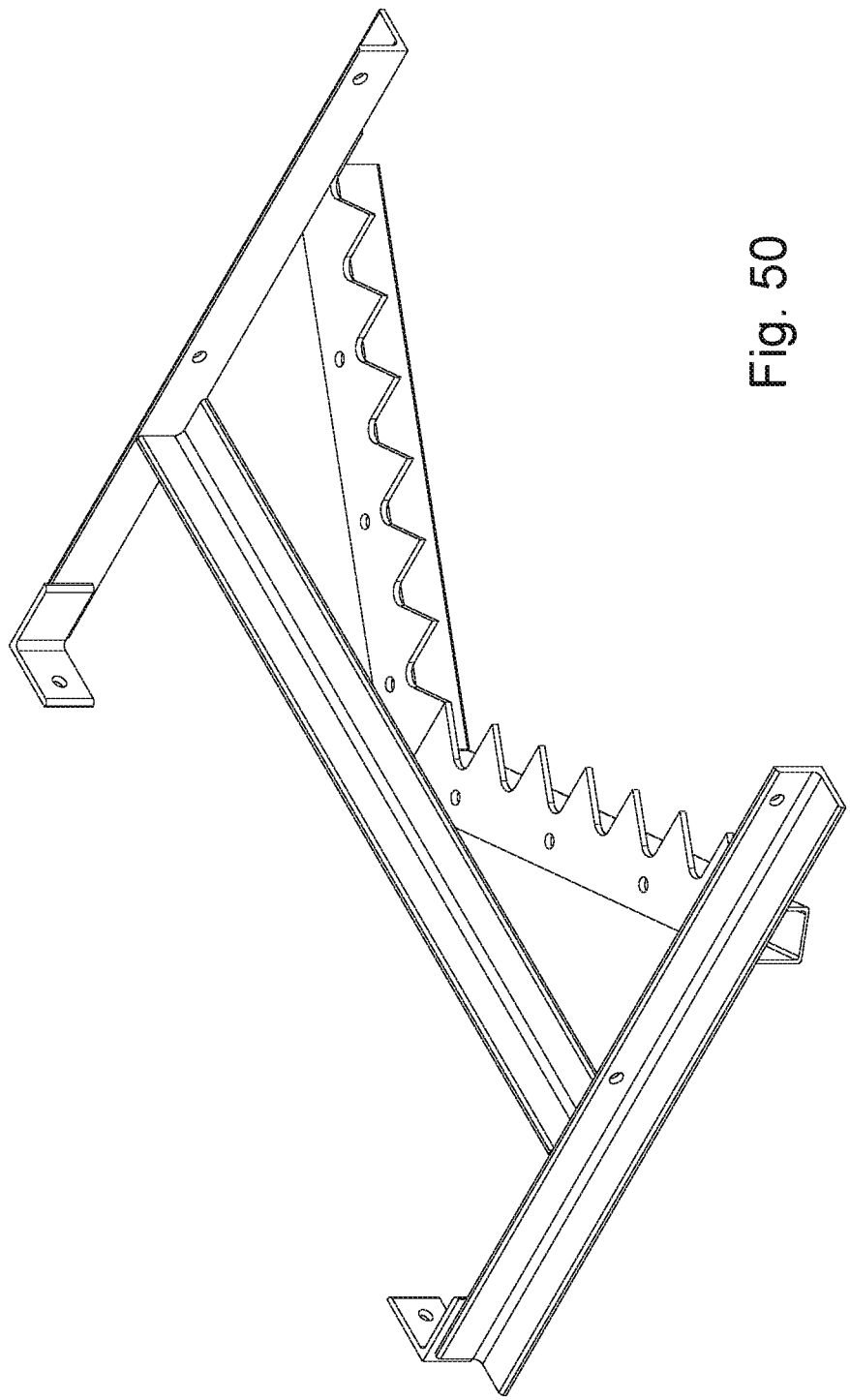
FIG. 50 shows a perspective view of an upper biter assembly according to various embodiments described herein.
Figure 53:
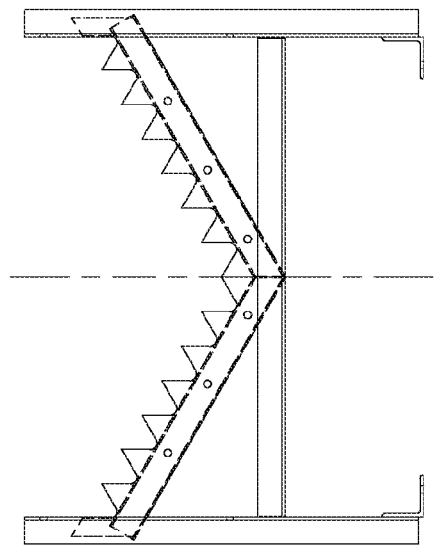
FIGS. 51-54 show a detailed view of an upper biter assembly according to various embodiments described herein.
Figure 52:
Figure 51:
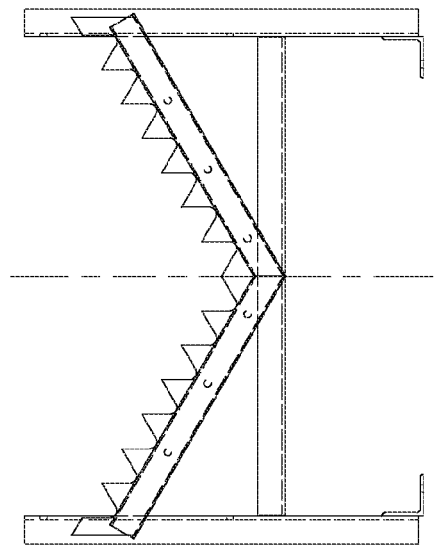
Figure 54:
Figure 57:
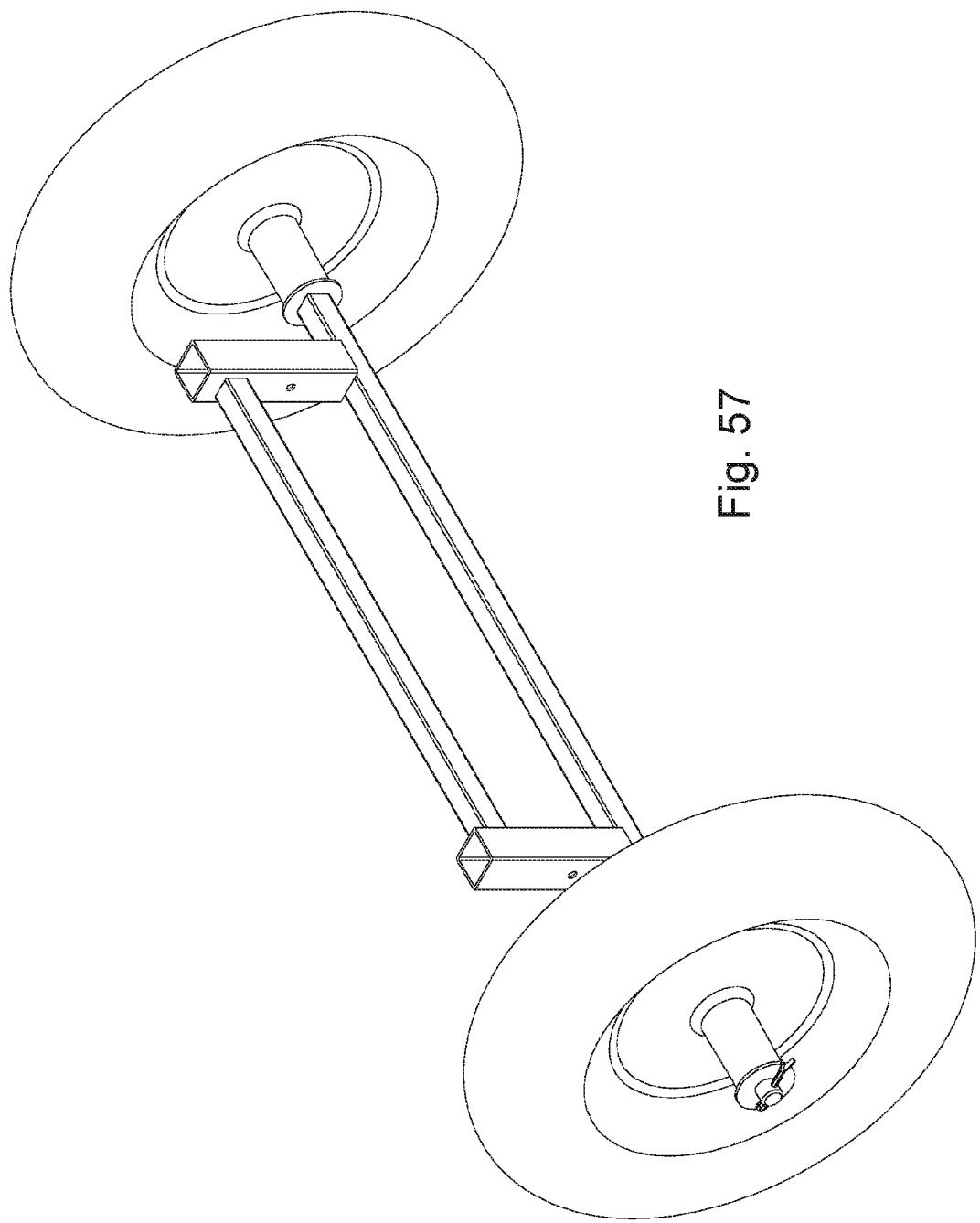
FIG. 57 depicts a detailed view of a wheel frame assembly according to various embodiments described herein.
Figure 58:
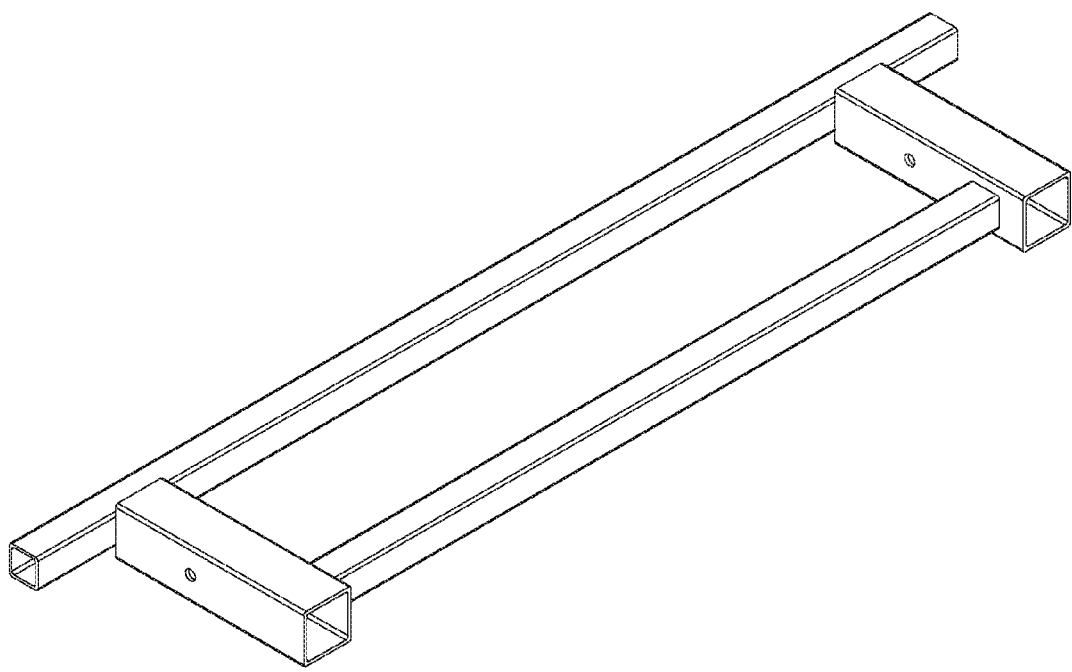
FIG. 58 depicts a perspective view of a wheel base frame according to various embodiments described herein.
Figure 61:
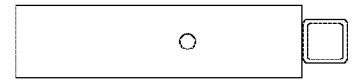
FIGS. 59-61 depict a wheel axle weldment according to various embodiments described herein.
Figure 60:
Figure 59:
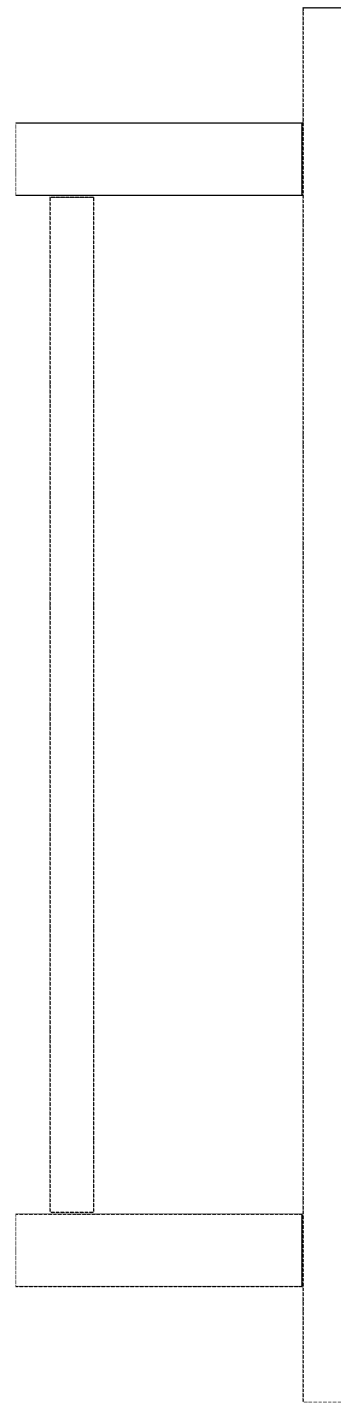
Figure 63:
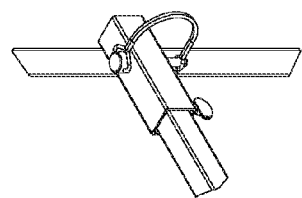
FIGS. 62 and 63 illustrate a perspective view of a "shooting rail" assembly according to various embodiments described herein.
Figure 62:
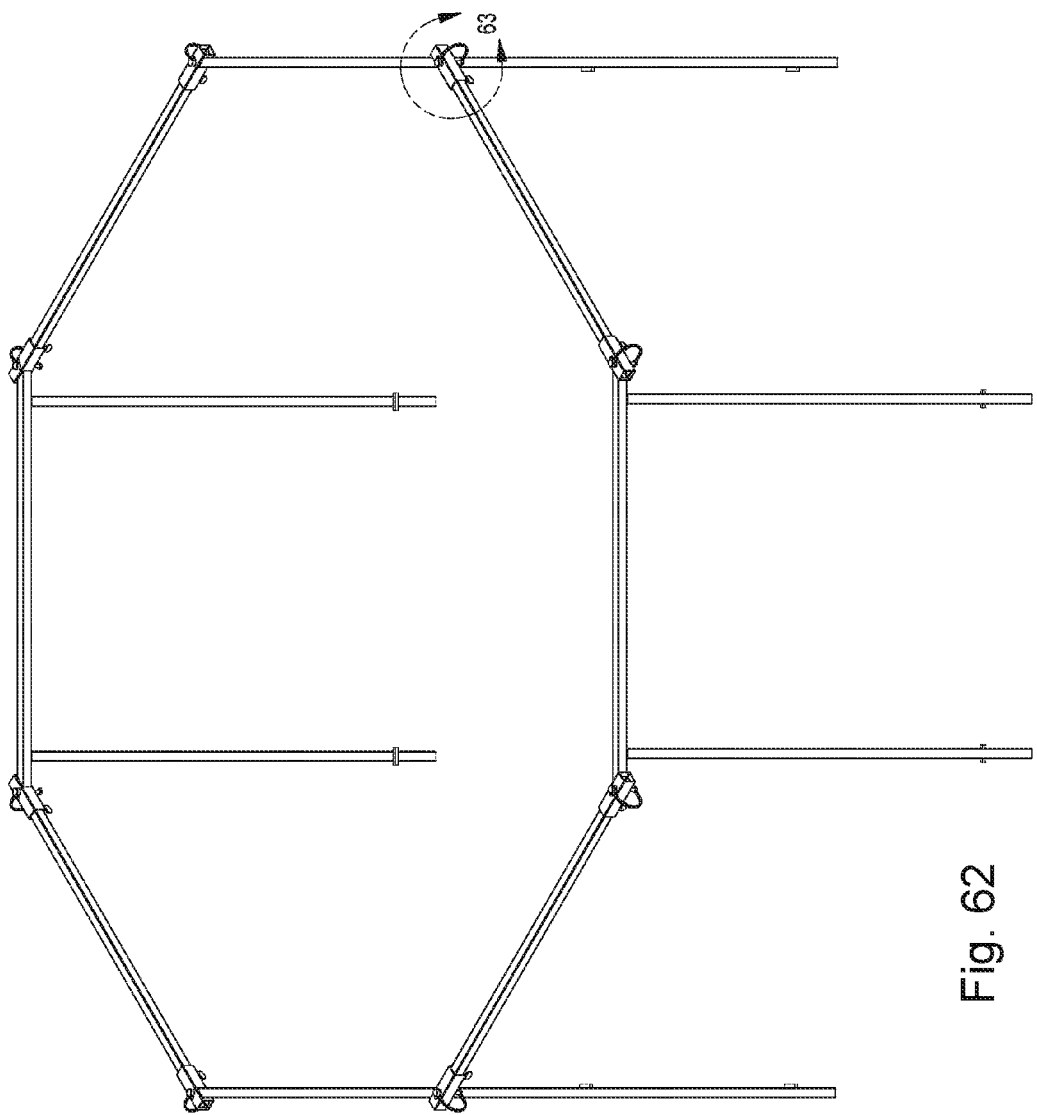
Figure 64:
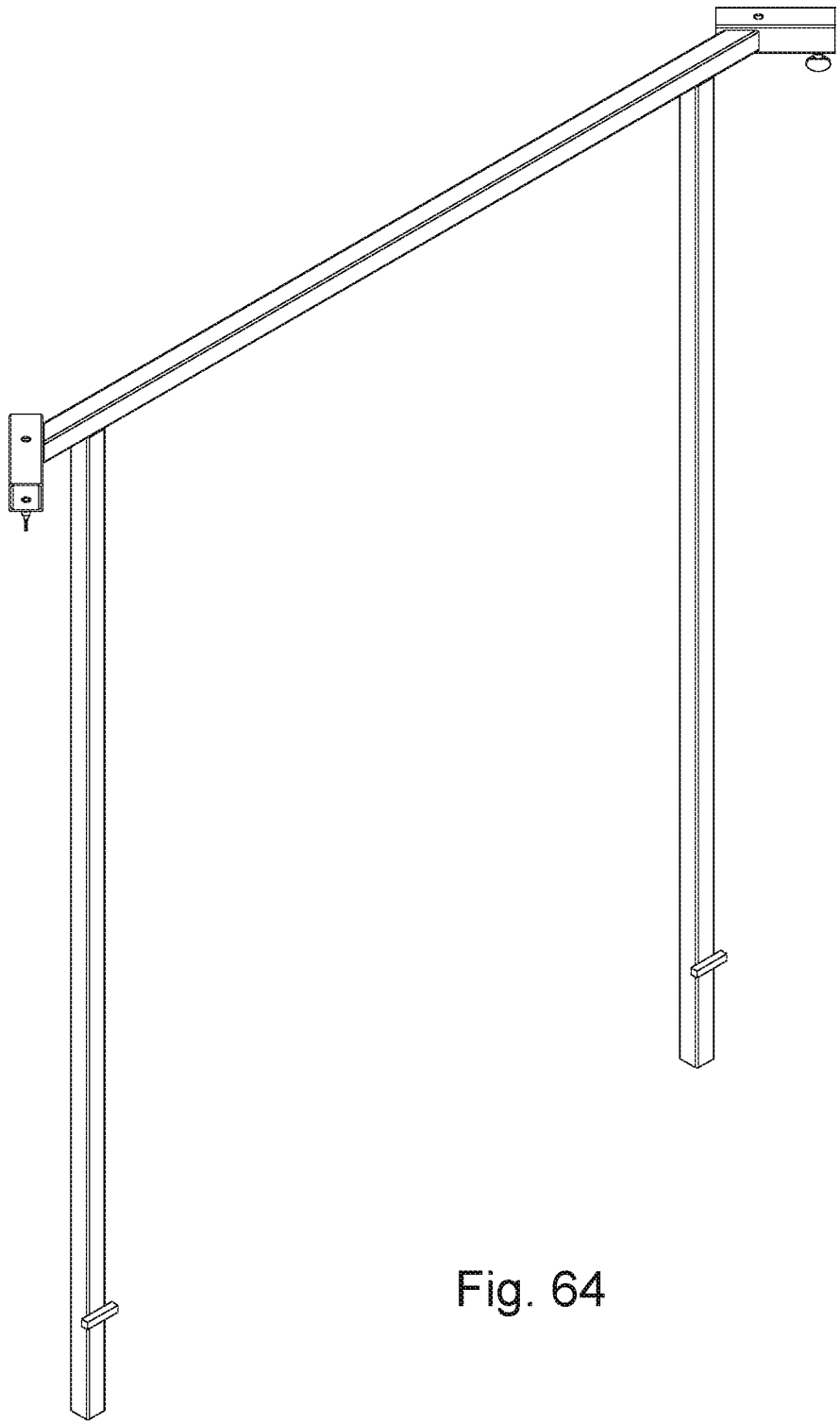
FIG. 64 illustrates a perspective view of a "shooting rail" section according to various embodiments described herein.
Figure 68:
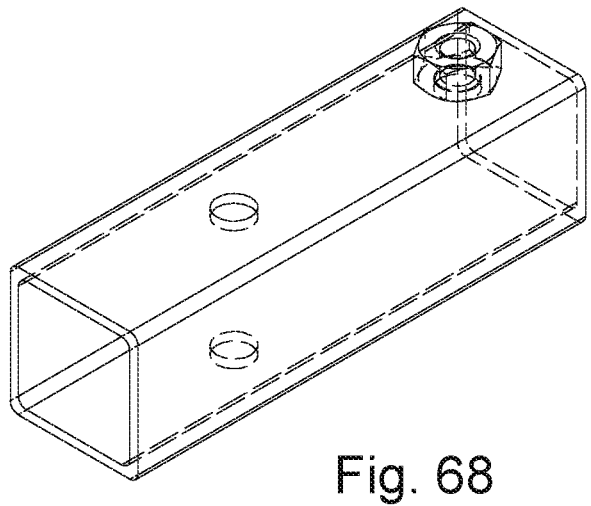
FIGS. 68-70 illustrate a detailed view of a rail support according to various embodiments described herein.
Figure 69:
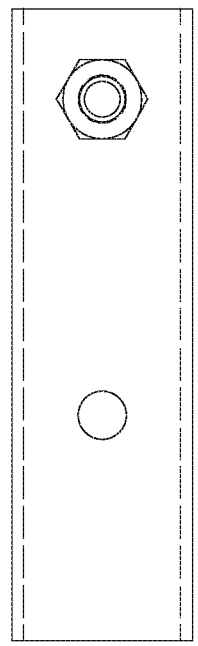
Figure 70:
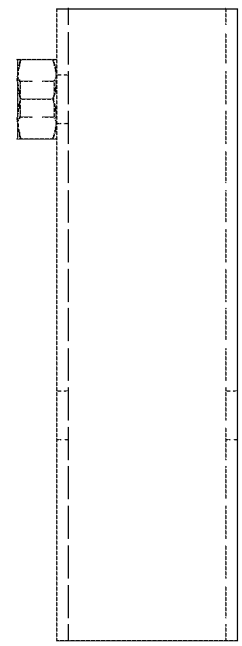
Figure 71:
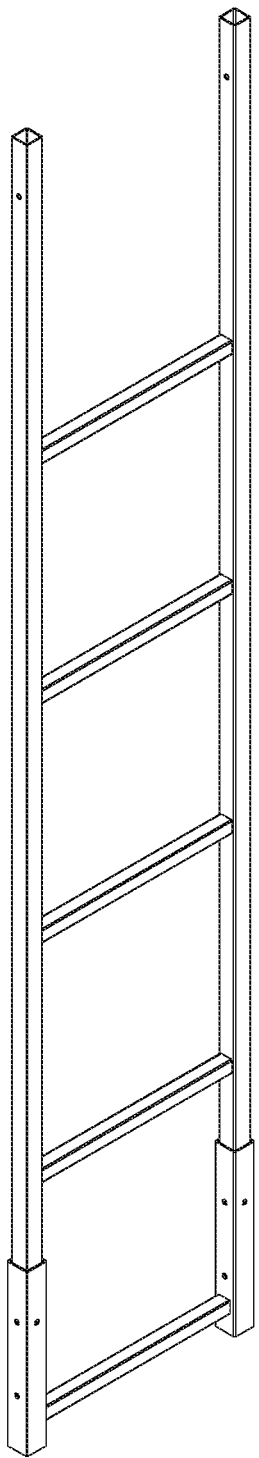
FIG. 71 shows an elevation view of an example of an upper ladder section according to various embodiments described herein.
Figure 74:
FIGS. 72-74 show a detailed view of an example of an upper ladder section according to various embodiments described herein.
Figure 73:
Figure 72:
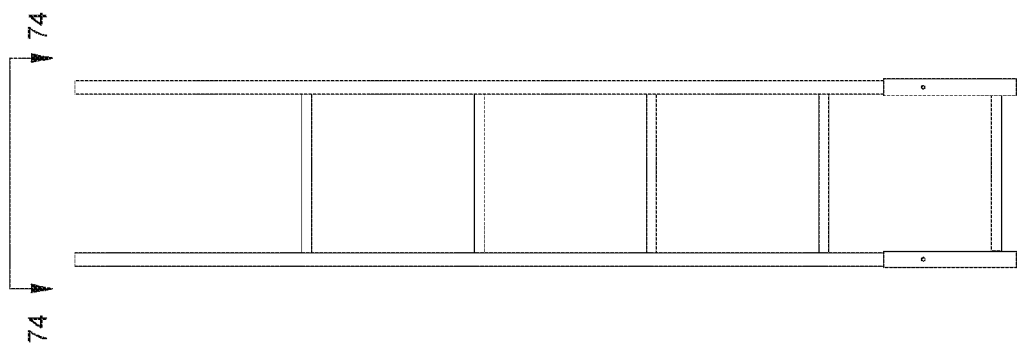
Figure 77:
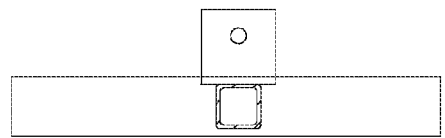
FIGS. 75-77 show an elevation view of an example of a lower ladder section according to various embodiments described herein.
Figure 76:
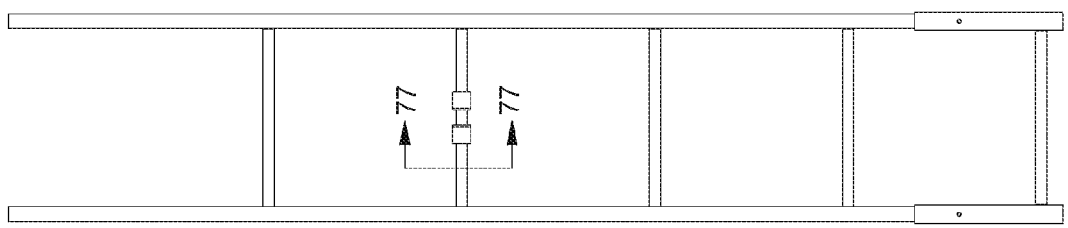
Figure 75:
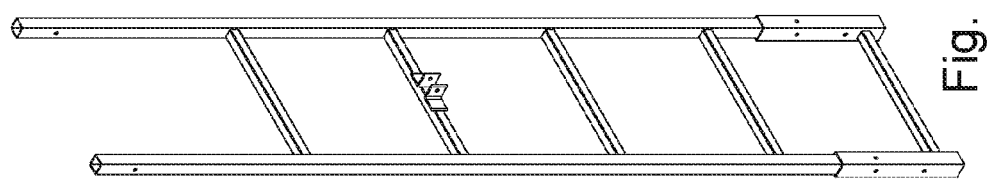
Figure 78:
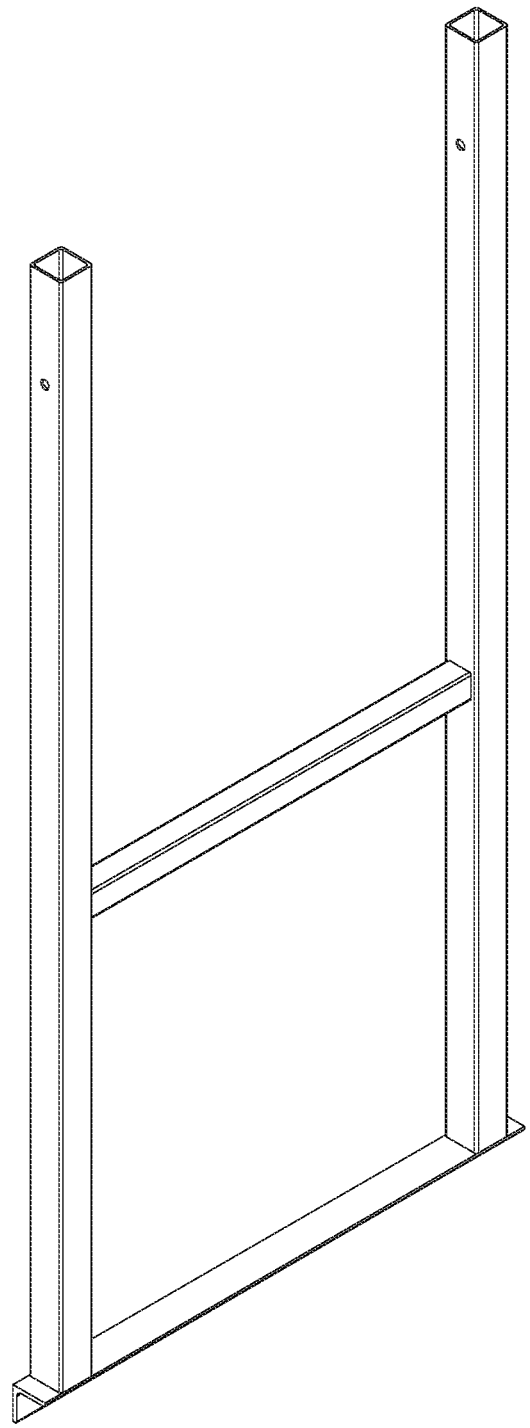
FIG. 78 shows an elevation view of an example of a footer ladder section according to various embodiments described herein.
Figures 79, 80:
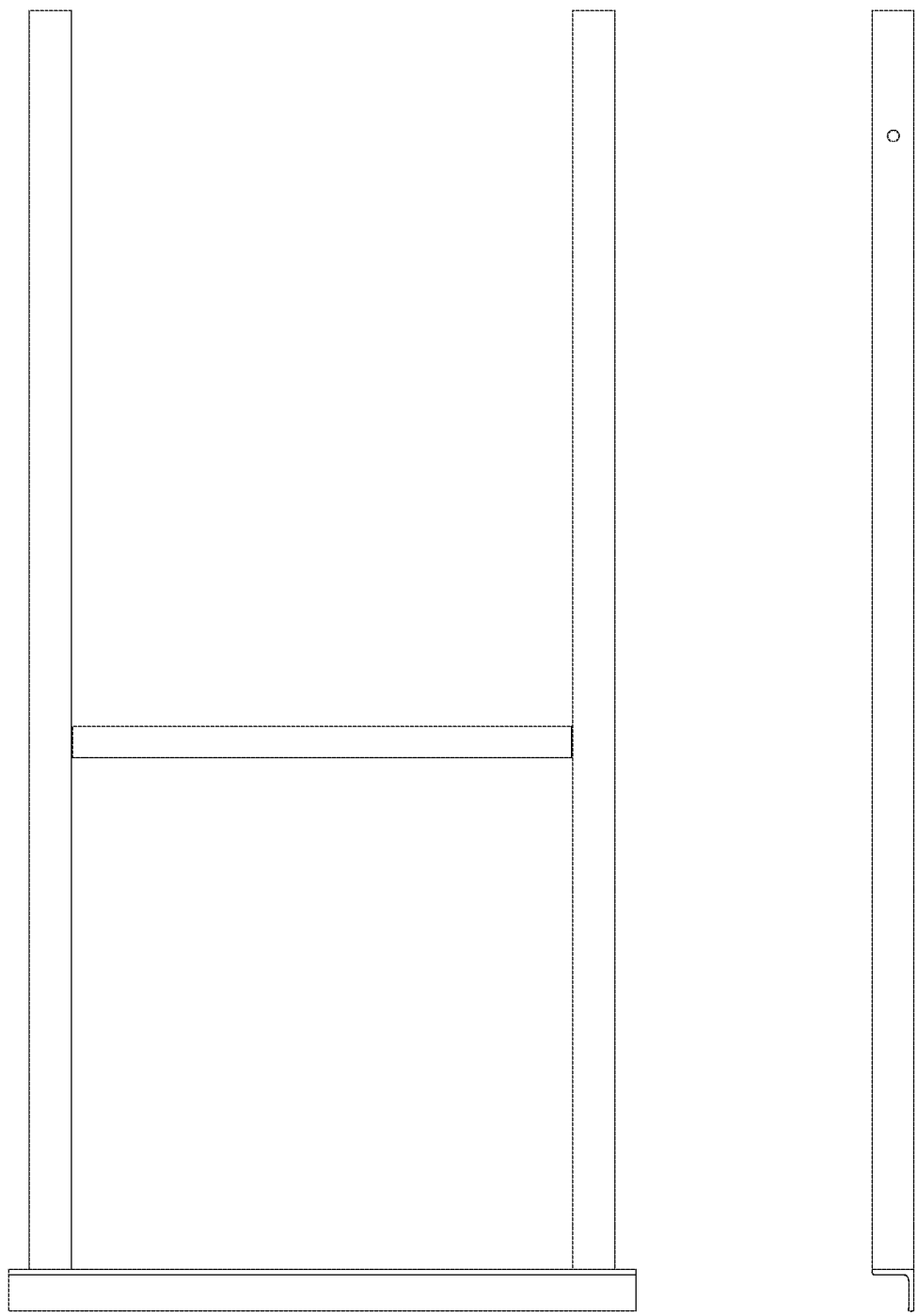
FIGS. 79 and 80 show a detailed view of an example of a footer ladder section according to various embodiments described herein.
Figure 81:
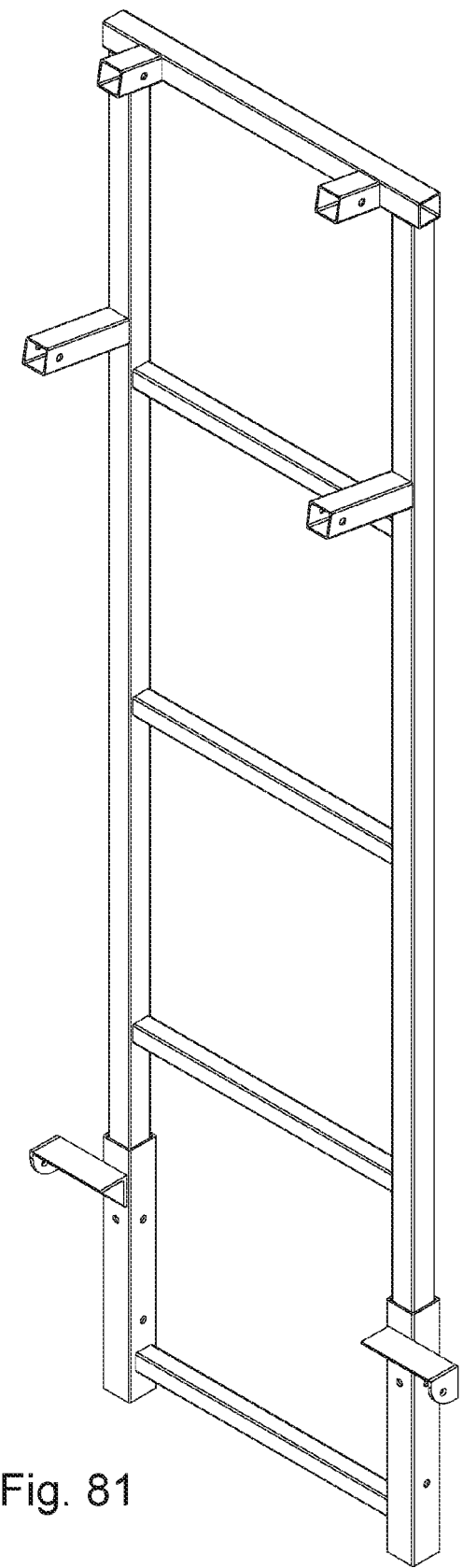
FIG. 81 shows an elevation view of an example of a removable platform ladder section according to various embodiments described herein.
Figure 88:
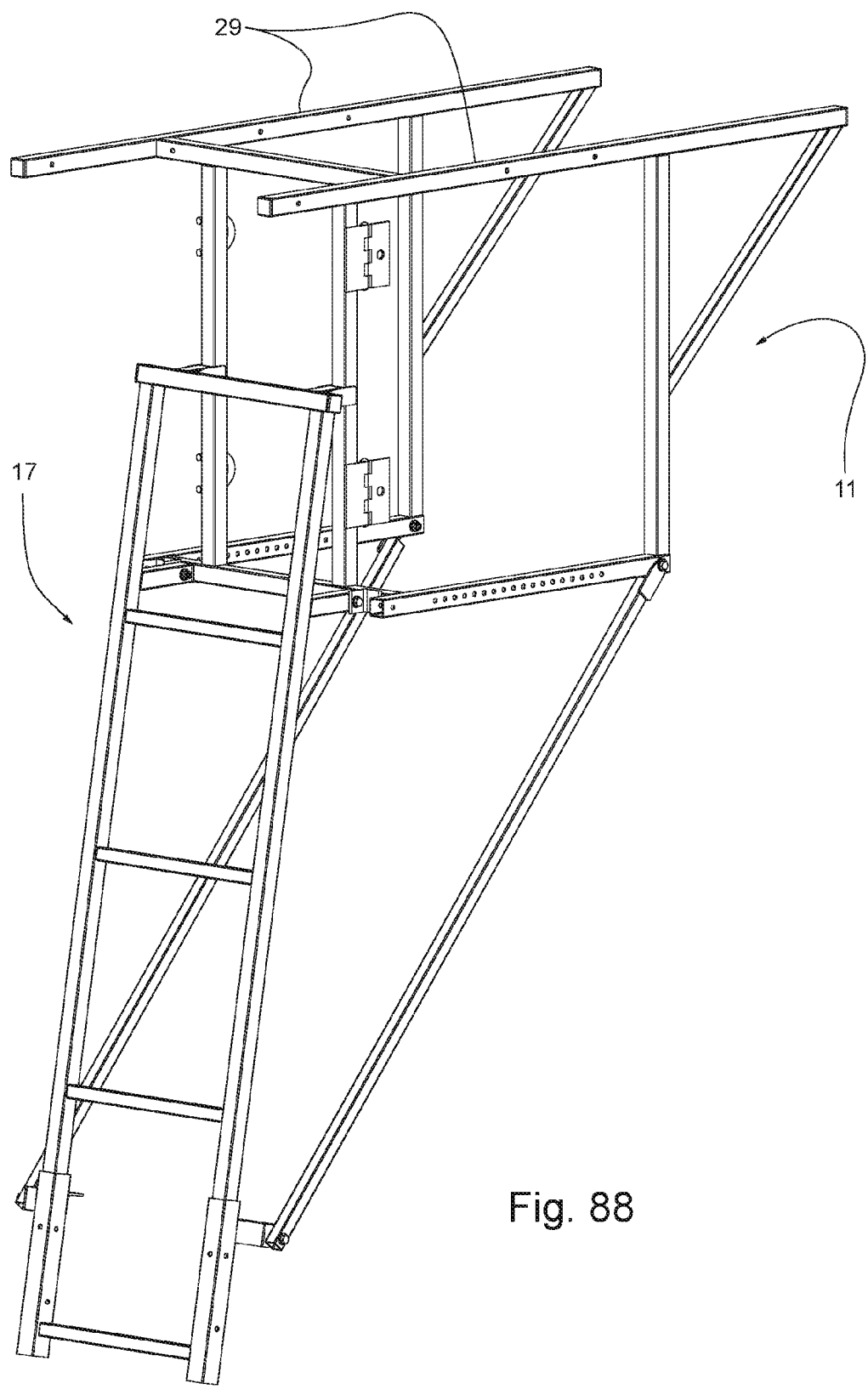
FIG. 88 shows an elevation view of an example of a removable platform ladder section attached to the base assembly according to various embodiments described herein.
Figure 89:
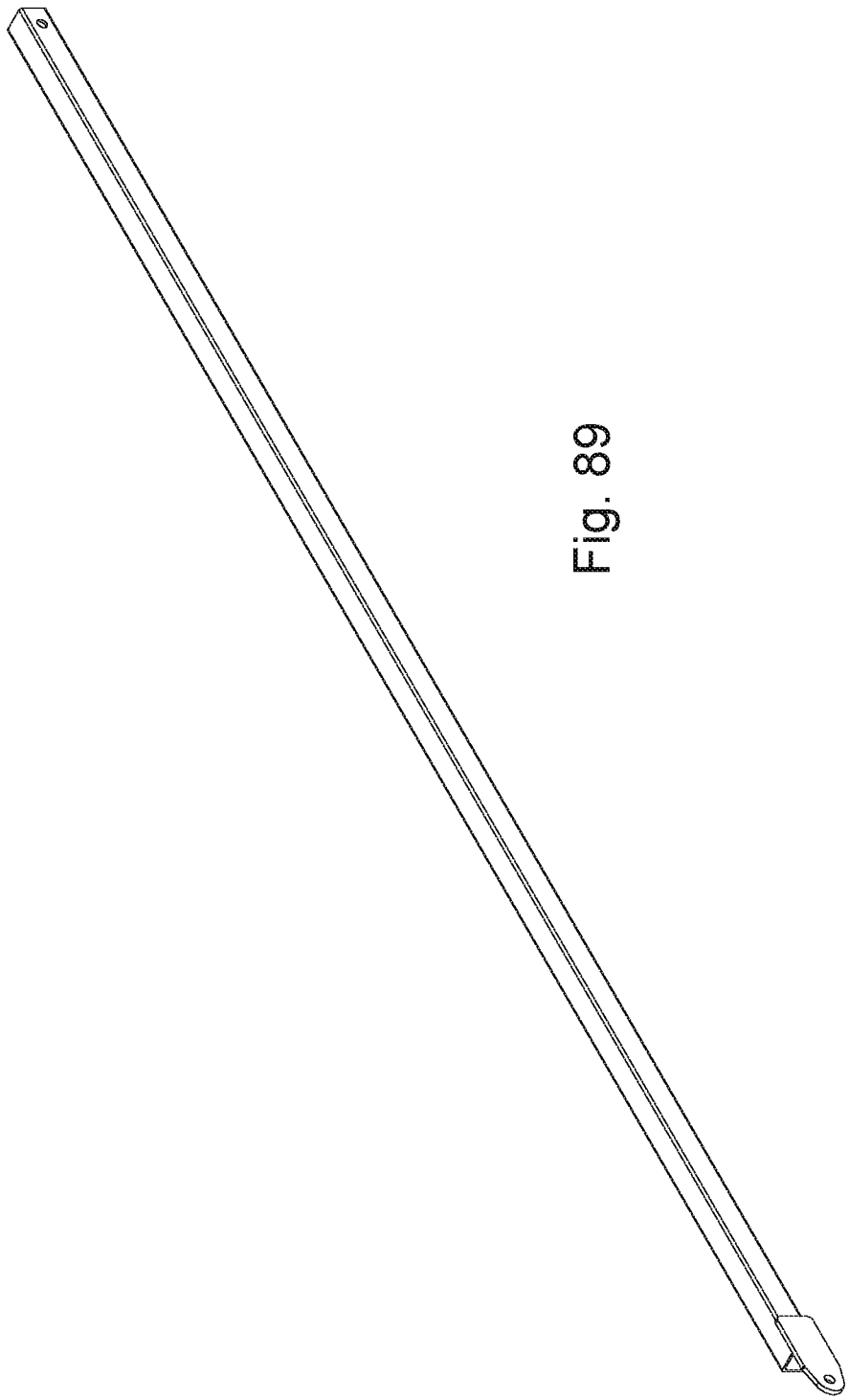
FIG. 89 shows a perspective view of an example of a removable platform ladder support according to various embodiments described herein.
Figure 90:
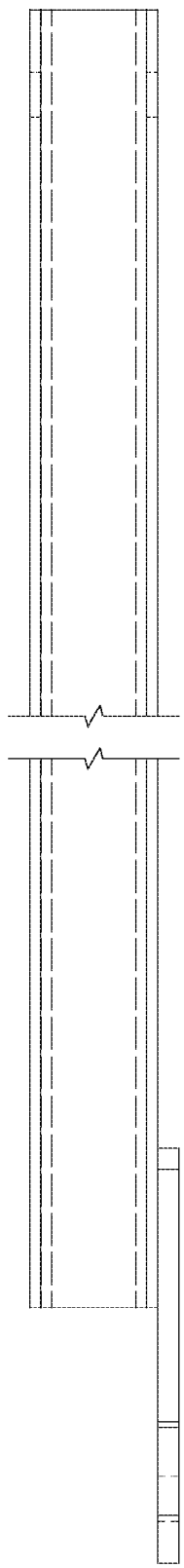
FIGS. 90 and 91 show a detailed view of an example of a removable platform ladder support according to various embodiments described herein.
Figure 91:
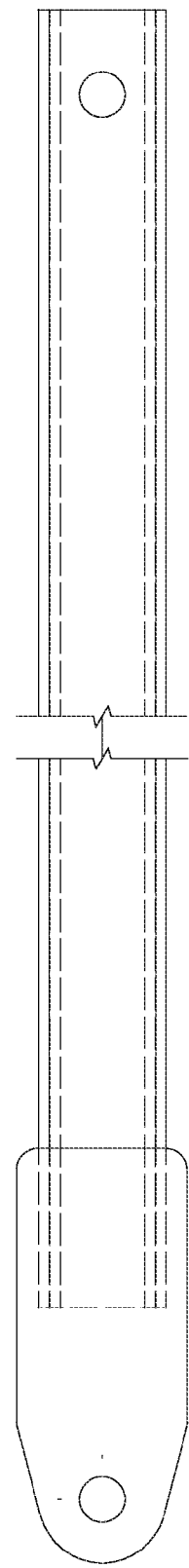
Figure 92:
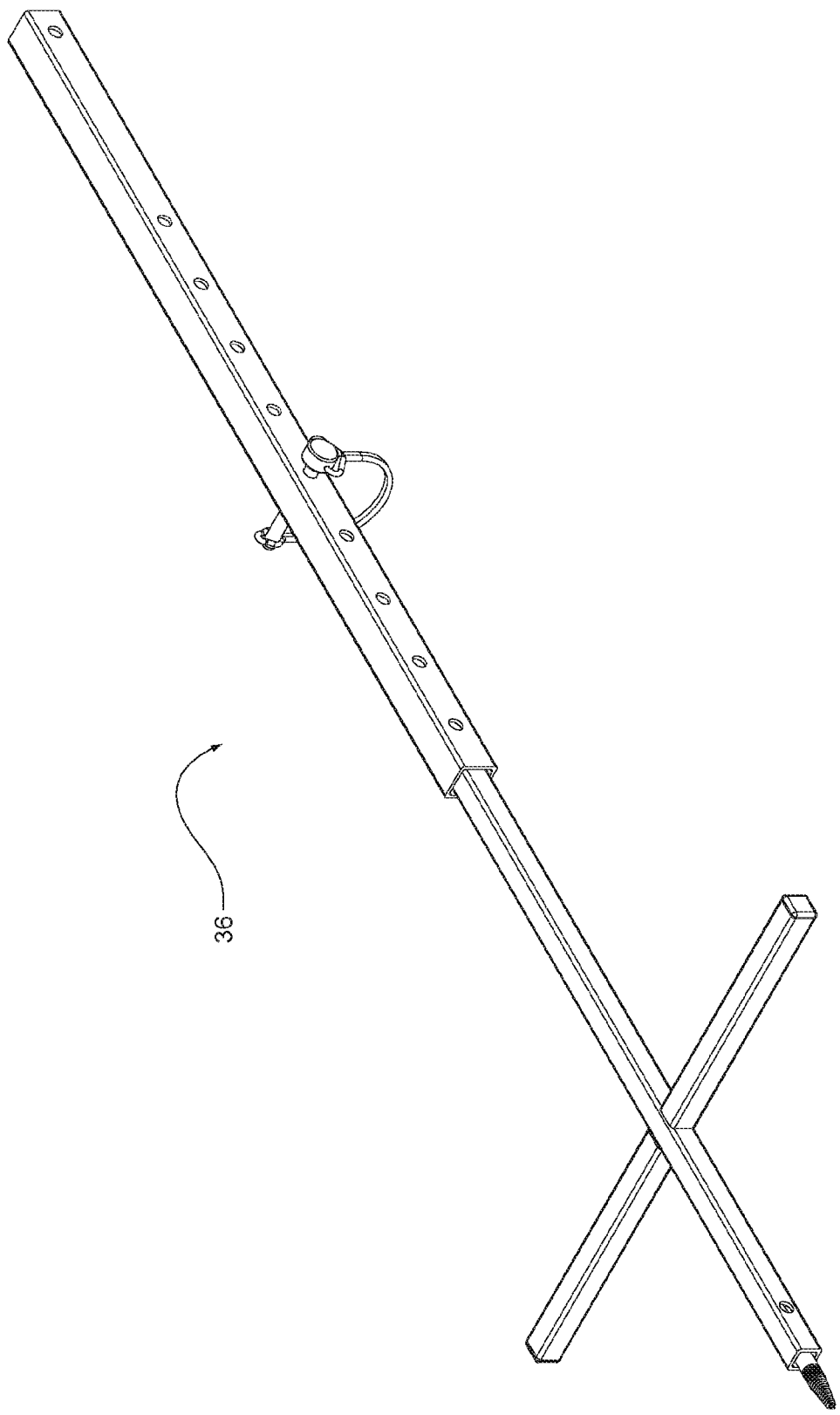
FIG. 92 shows a perspective view of an example of a ladder anchor brace according to various embodiments described herein.
Figure 93:
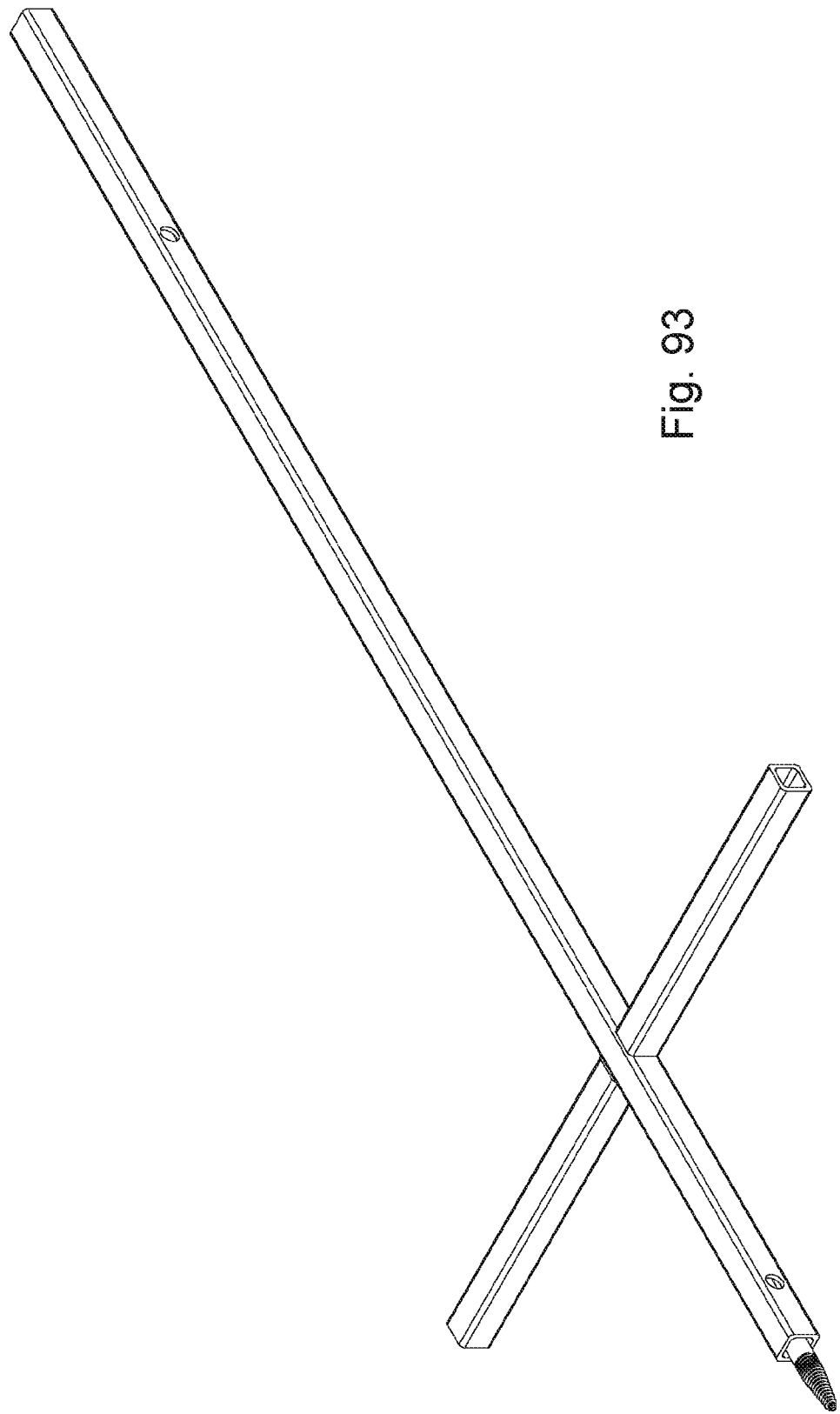
FIG. 93 shows a perspective view of an example of a ladder anchor brace weldment according to various embodiments described herein.
Figure 97:
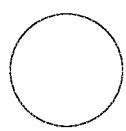
FIGS. 96 and 97 show a detailed view of an example of a ladder anchor brace screw according to various embodiments described herein.
Figure 96:
Figure 98:
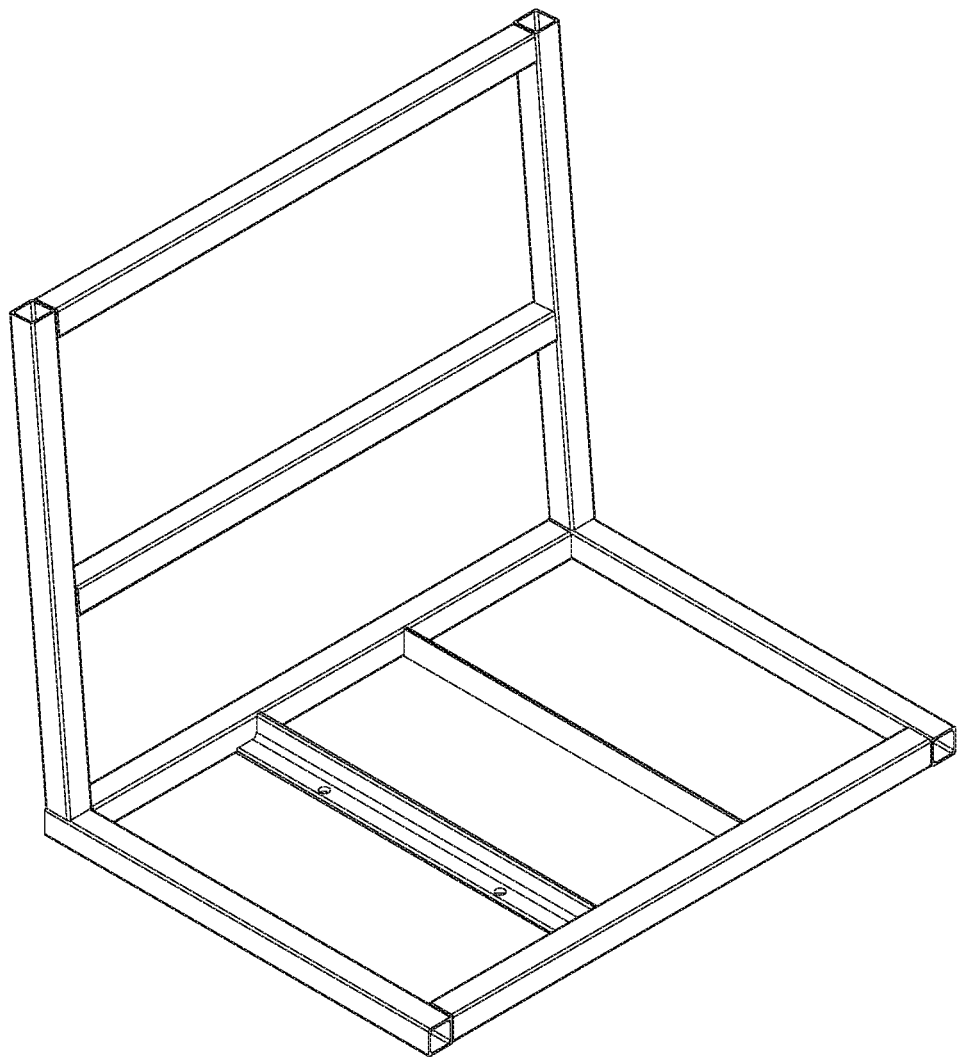
FIG. 98 illustrates an example of a seat according to various embodiments described herein.
Figure 103:
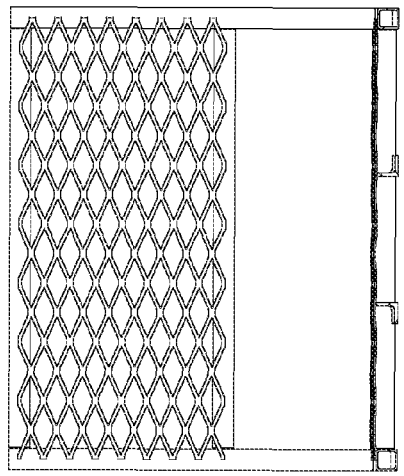
FIGS. 99-103 illustrate an example of a seat weldment according to various embodiments described herein.
Figure 101:
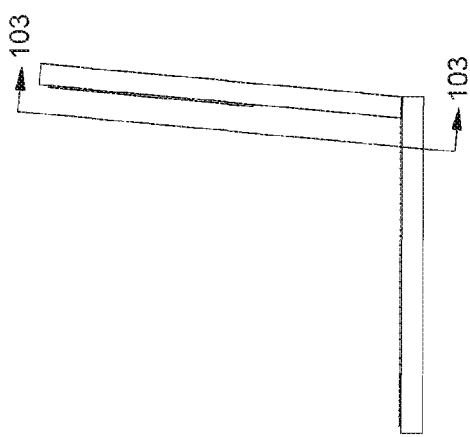
Figure 102:
Figure 99:
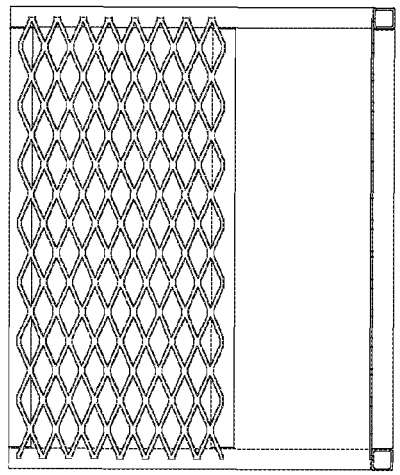
Figure 100:
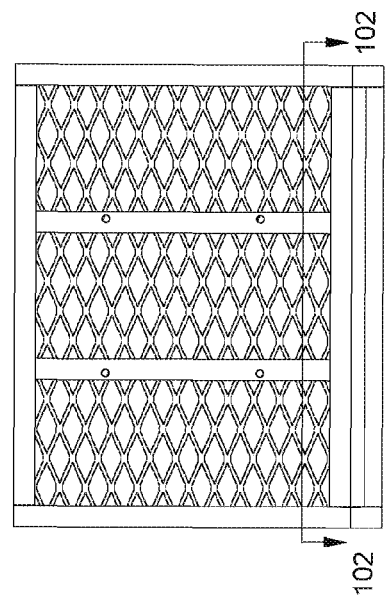
Figure 104:
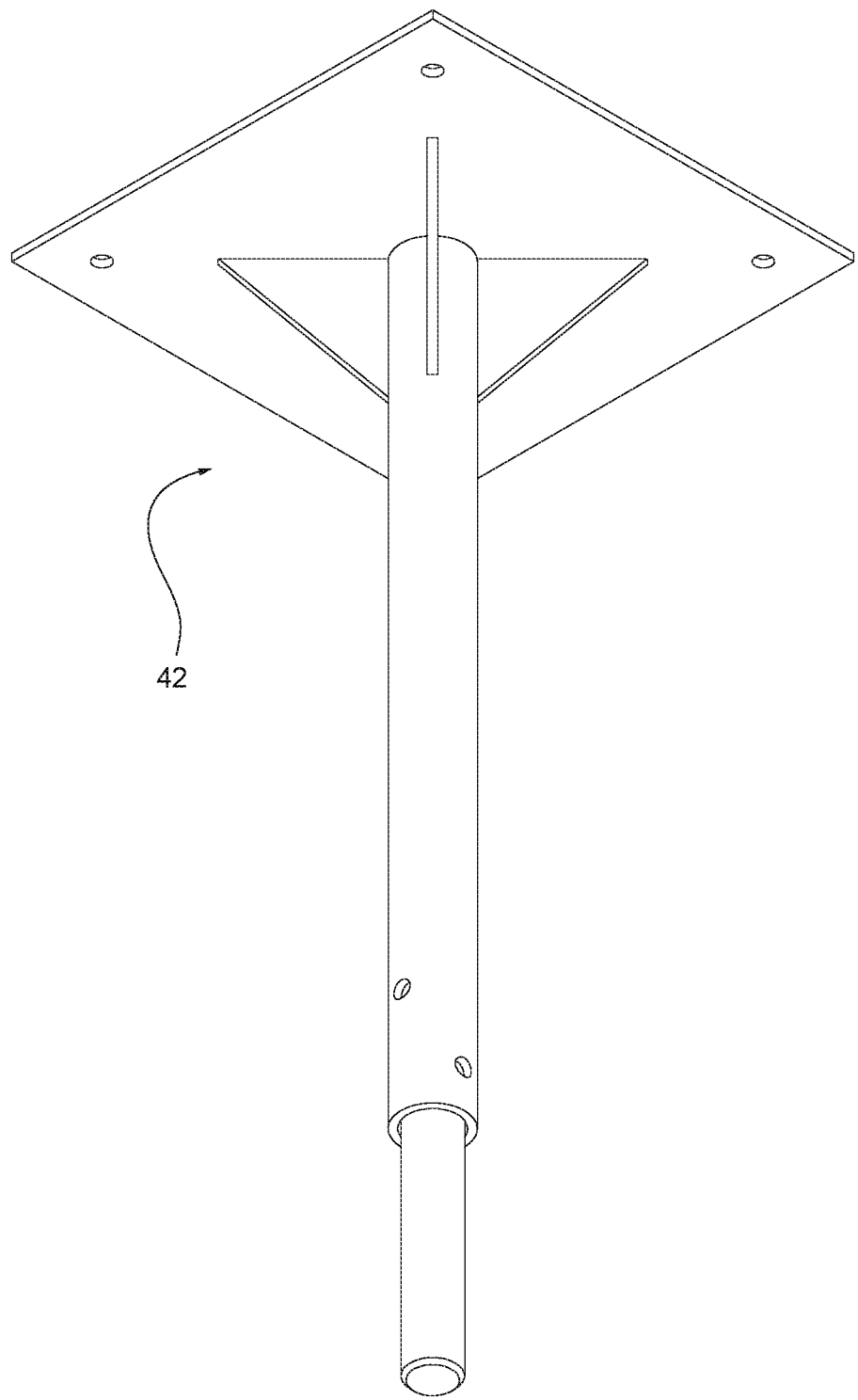
FIG. 104 illustrates a view of an example of a "post" seat support according to various embodiments described herein.
Figure 105:
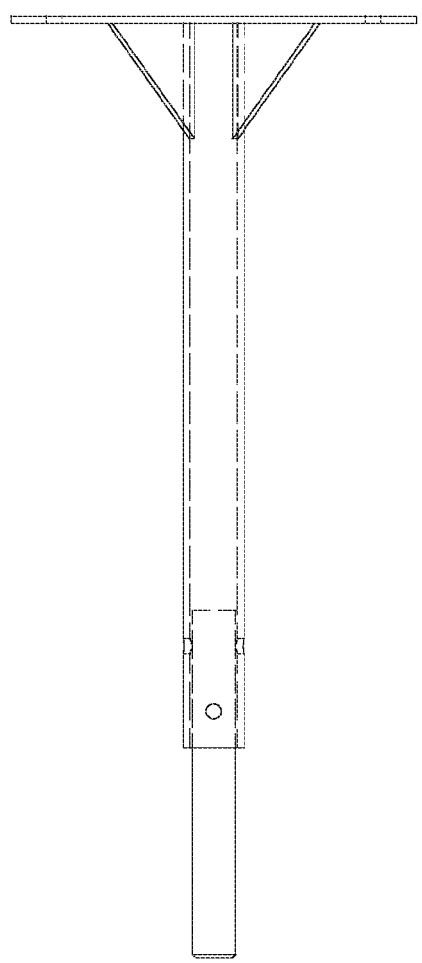
FIGS. 105-107 illustrate a view of an example of a "post" seat support weldment according to various embodiments described herein.
Figure 106:
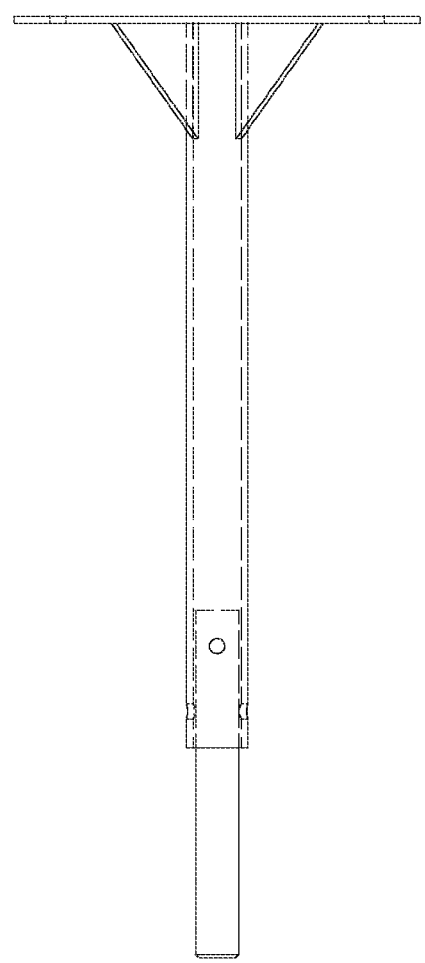
Figure 107:
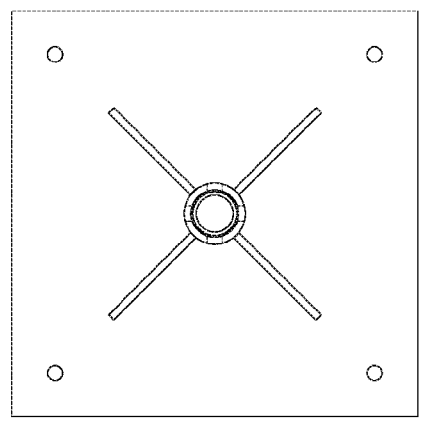
Figure 108:
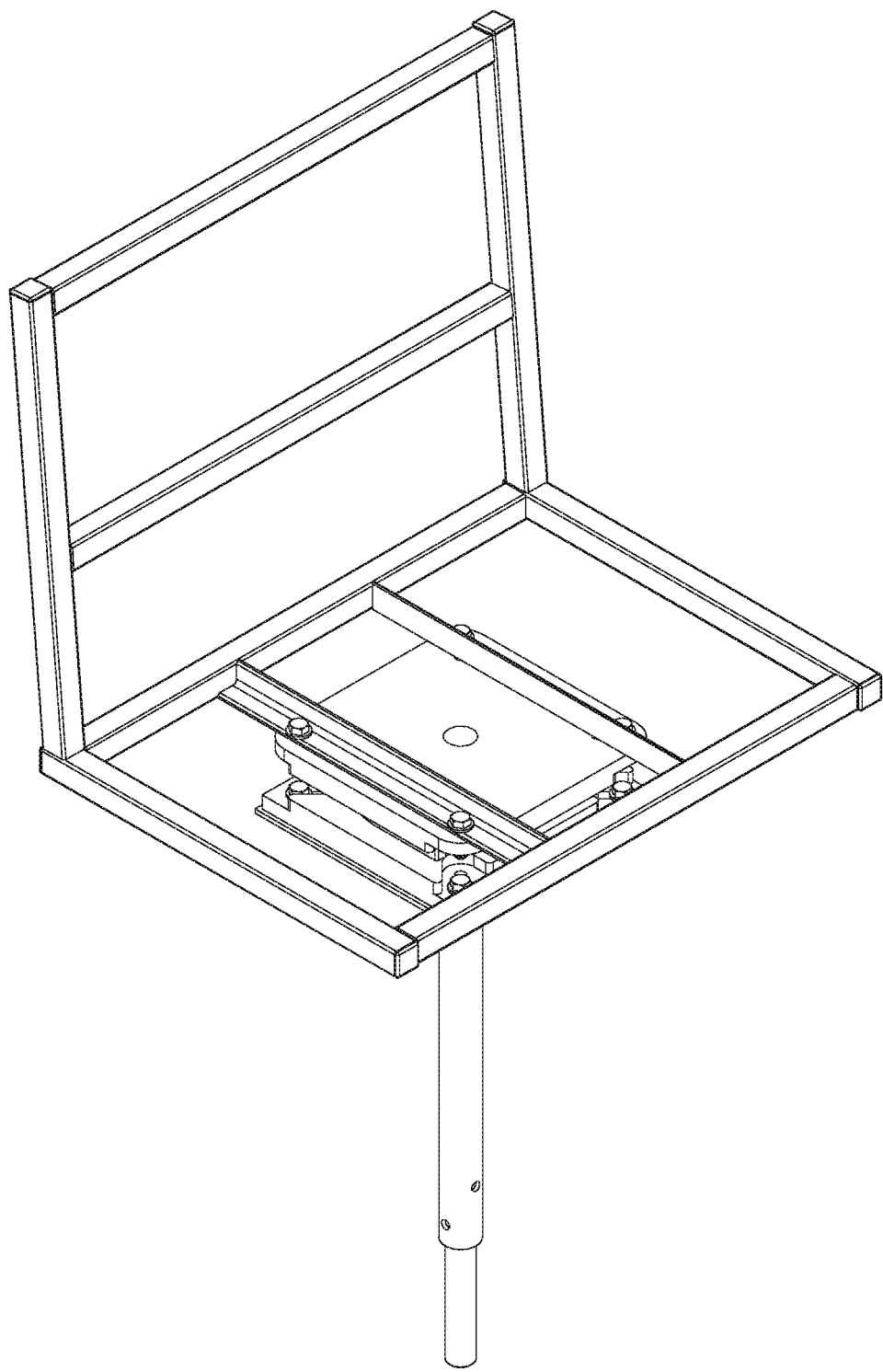
FIG. 108 shows a view of a seat mounted on a post with swivel according to various embodiments described herein.
Figure 109:
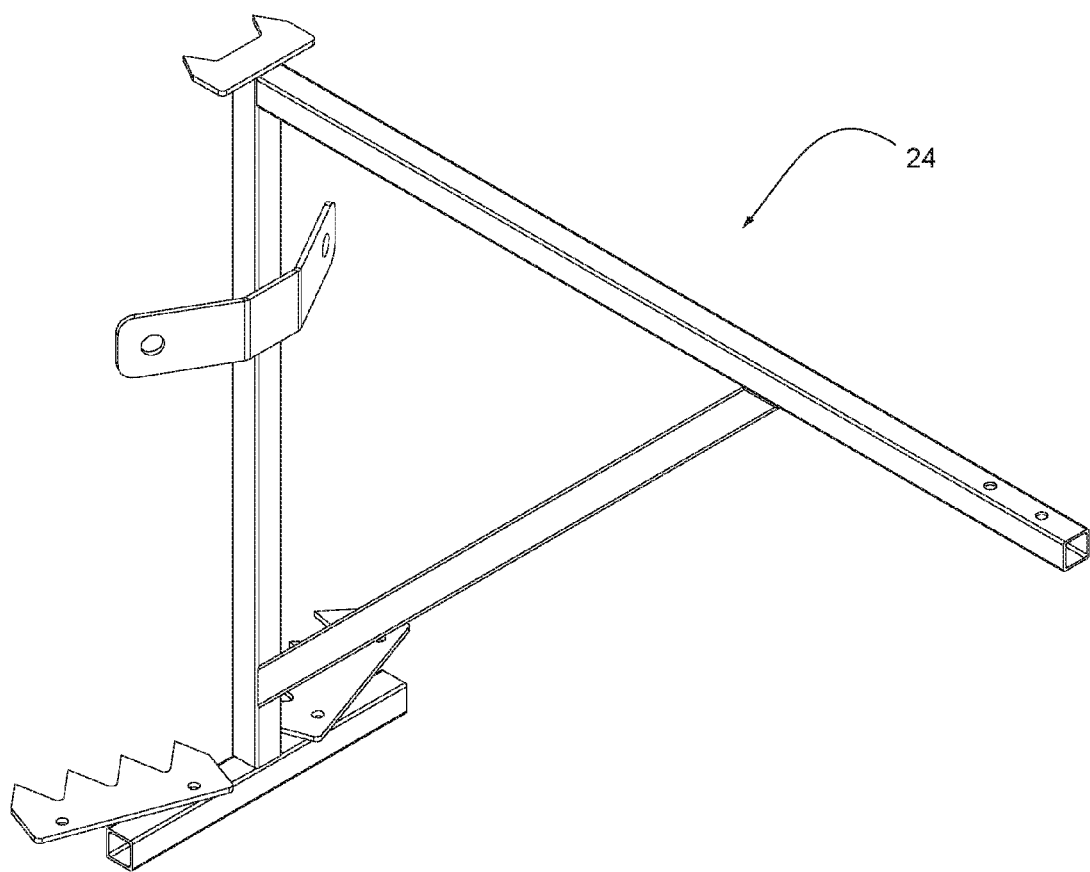
FIG. 109 shows a view of a "hoist" used to bring up the floor sections of the platform according to various embodiments described herein.
Figure 116:
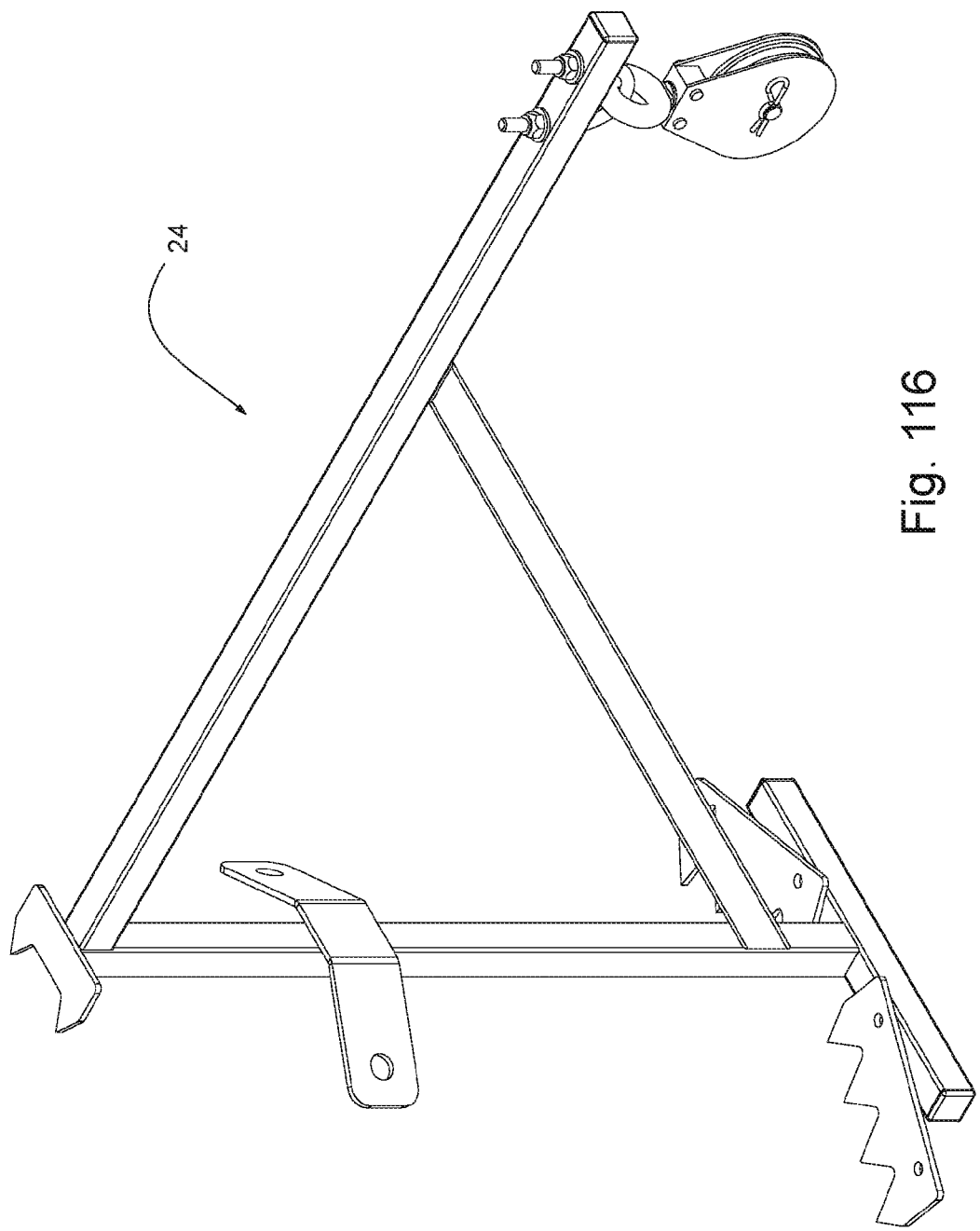
FIG. 116 illustrates a view of the "hoist" complete with pulley according to various embodiments described herein.
Figure 119:
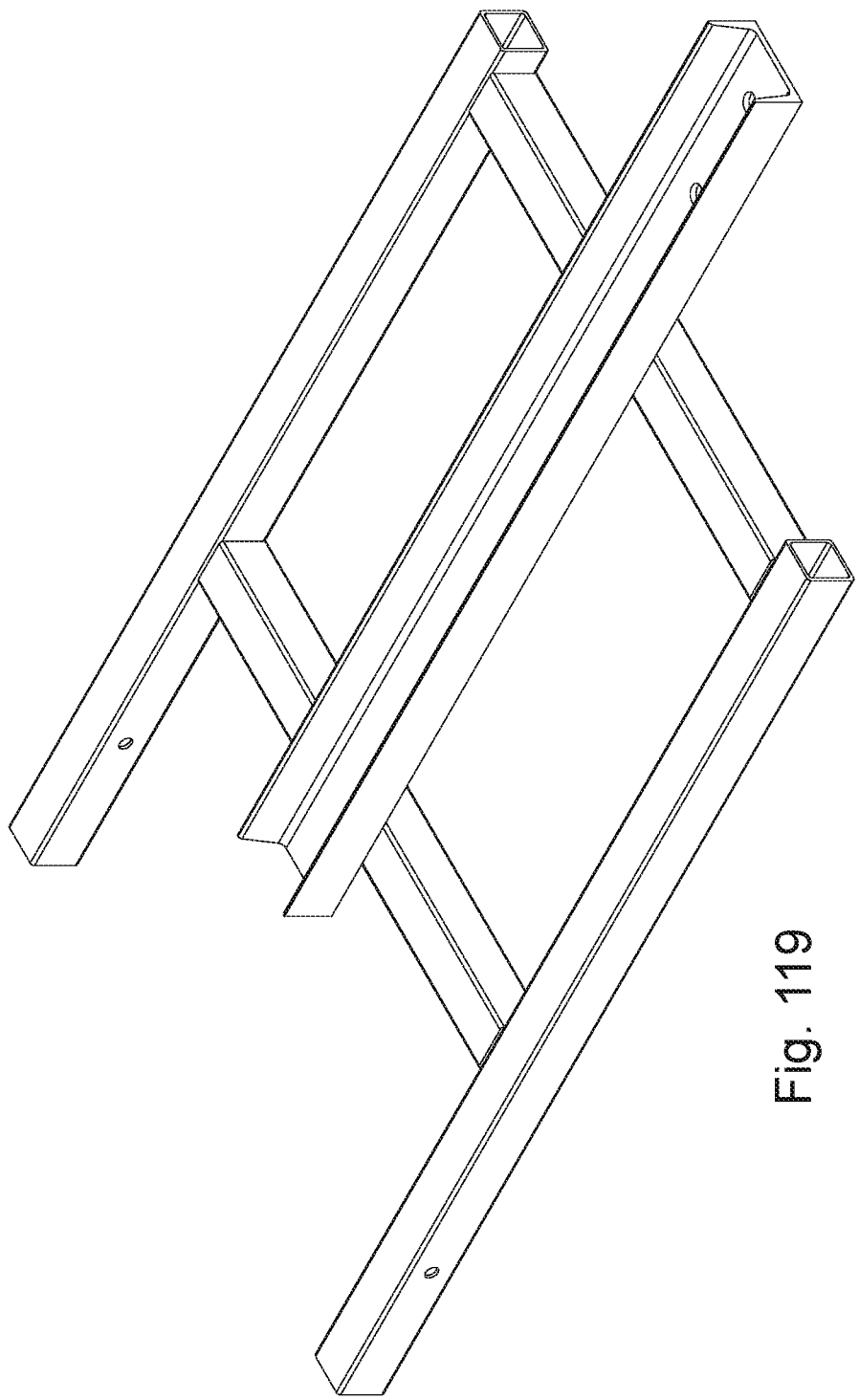
FIG. 119 illustrates a view of the "ATV" tow hitch assembly according to various embodiments described herein.

With reference to the drawings, in preferred embodiments, an Octagon portable tree platform ("the platform") 10 comprises a portable tree leaning platform designed to give the user(s) a 360 degree view of the area from optionally different heights. The base 11 of the platform may comprise a stationary upper biter 12 and an adjustable lower biter 14 that slides within the base frame of the platform and locks in position on a series of pin holes 16 using two wire locking pins in order to fit trees of various diameters. The base may also have a 4'-section of ladder 17 (See FIG. 88) pinned, welded or otherwise attached to it. One or more retractable ratchet binder straps 18 or other suitable binder type securement (See FIG. 9), (optimally the straps are made of two inch width nylon) may be bolted onto or otherwise attached to the base that wrap around the tree and attach to the base to provide further securement on the tree trunk. In preferred embodiments the platform base may be made of ¾", and 1" steel hollow square tubing and pieces of flat expanded metal, while in other embodiments, different suitable materials and dimensions may be used. In preferred embodiments, the floor pieces may be made of ¾", and 1" square hollow steel tubing and covered in expanded metal or other suitable material. In preferred embodiments, the cantilevers may be made of ⅛" metal plate brackets and ¾" square hollow steel tubing while in other embodiments other materials and dimensions may be used.

In some embodiments, installation can be done by first deciding the height for use and adding the appropriate ladder sections. The height of the base position on the tree can be changed by using the two additional ladder sections which are made from 1" and ¾" steel hollow square tubing while in other embodiments different suitable materials and dimensions may be used and then attaching them to each other using pin holes at the opposite ends and secured together with wire locking pins or other attachment methods. A ladder "footer" piece 22 may attach to the bottom through pin holes with wire locking pins to ensure ladder foot stability. The height positions can be changed to have a platform height of 7', 13', 18' or more with the addition of other ladder sections and anchor braces. Once the base is initially secured using the top ratchet strap tightened down 18, the pulley system 24 will need to be installed at approx 4' above the base. The entry floor platform piece 26 can be installed by pulling it up into position with the pulley system 24 and placing the piece 26 on top of the base 11 and pinning it to the base 11 using the series of pin holes 28 on the base rails 29 and wire locking pins or other attachment methods to hold it in position. The entry floor platform piece 26 may also have a hinged floor entry door that can be raised to allow for access to the floor and then lowered to allow for full movement on the platform around the tree.

The second (opposite) platform floor piece 30 may now be brought up using the pulley system 24 and placed on the opposite side. Resting on the base rails 29, the second platform piece 30 can then be lowered into position using one or more interlocking "U" channels that may grip to the entry platform floor piece. The interlocking "U" channels may be welded or otherwise attached to the opposite floor platform piece and may be made of 3/16" metal or other suitable material.

The adjustable cantilevers 32 (which may be attached to the underside of the opposite floor platform piece 30 using 5"×3"×0.125" metal plate brackets welded and bolted or otherwise attached) can now be pushed to the tree trunk using the small floor hole opening on the opposite floor platform piece 30 and also by user exiting the top of the platform, and reaching through the base 11 while on the top ladder section. This also allows for additional access to the other two cantilevers 32 in order to be tightened to the tree. The bottom retractable ratchet strap 18 can now be run through the cantilever 32 middle sections and then hooked or otherwise attached to the base 11. The bottom retractable ratchet strap 18 can then be tightened pulling the cantilevers to the tree. The biters 34 on the end of the cantilevers then dig into the tree completing the five-biter securement system, which consists of the two base frame biters 12, 14 (one fixed and one adjustable, and the three separate cantilevers 32 on the opposite floor platform piece 30).

The user can now climb down the ladder and install the ladder anchor brace 36 (preferably used on the 13' and 18' or higher set ups). The anchor brace 36 may be "corkscrewed" into the side of the tree that faces the back of the ladder or otherwise attached and then extended in order to secure to the ladder frame using a wire locking pin or using another attachment method. The anchor 36 can then be pulled snug and a second wire locking pin placed into one of several positions on the sliding rail. Installation of the platform is now complete.

The top of the platform floor sections 26, 30 may have preset mounting brackets 38 for the use of one or more seat positions around the base. There can be one or more seats 40 installed at once and it is up to the user(s) to decide where and how many of the seats they would like to use. In preferred embodiments, four mounting posts 42 (one per seat) may be used for the four seat positions on the platform at once. If the platform is being used as a standing platform only, then none of the seats or mounting posts has to be used and may not be attached to the platform. (Examples of standing platform activities include but are not limited to bow hunting, photography, video applications or sport "zipline" or any other type of activity or applications that do not require a seat.)

The seats may be made of ¾" steel hollow square tubing with expanded metal covering the seat and portion of the back while in other preferred embodiments, different suitable materials and dimensions can be used. The "post" 42 made from 12.5" hollow tube steel with welded or otherwise attached piece of 6" Zinc Hex capped screw with a 7"×7"×0.125" metal plate welded or otherwise mounted on top with four small holes at the corners to attach to the bottom of the seat with the use of a suitable swivel. The seat back and bottom may be covered with a foam cushion which may be covered in a waterproof material and may be secured to the seat frame by using sewn elastic material, nylon & velcro straps or other attachment method.

The platform may have optional "shooting rail" mounts 44 on the floor sections and have a 1" or higher "toe kick" edge or other suitable "edge finder" attachment piece. In preferred embodiments, this "toe kick" may be made of ⅛"×2"×¼" metal bar stock attached to the edge by a weld or other attachment method and may be one or more inches in height spanning the circumference of the platform outer floor. The "shooting rail" 46 may comprise of eight pieces of ¾" square steel tubing pinned together with wire locking pins and small turn pins and dropped into eight mounting brackets 44 on the floor outside edge surface while in other embodiments, different suitable materials and dimensions may be used. The top of the rail may be covered in round foam tubing which may then be covered with optional woodland or wetlands reed style camouflage waterproof material using sewn on velcro straps or other attachment methods.

Figure 123:
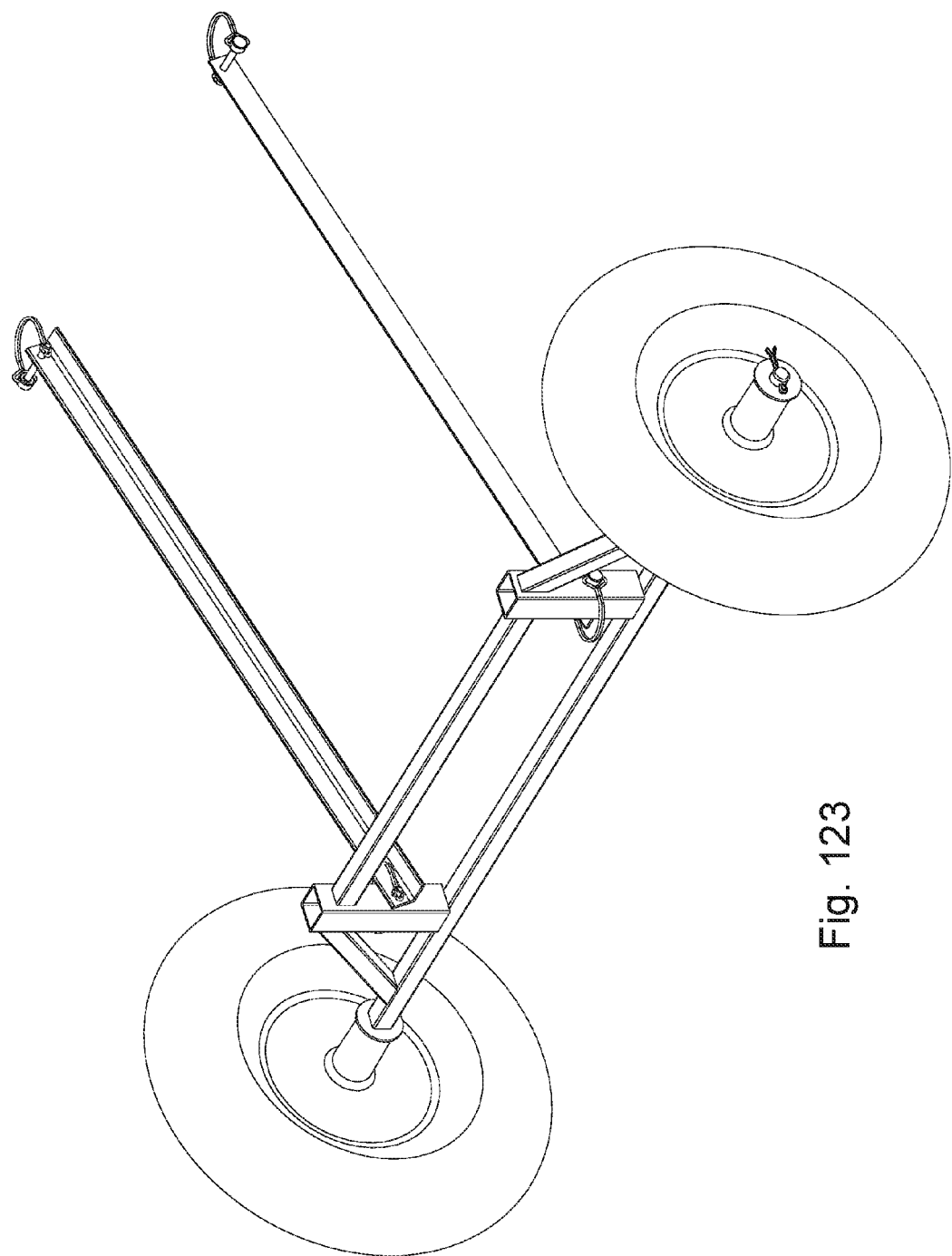
FIG. 123 illustrates an example of a view of the "ATV" hitch trailer assembly according to various embodiments described herein.
Figure 124:
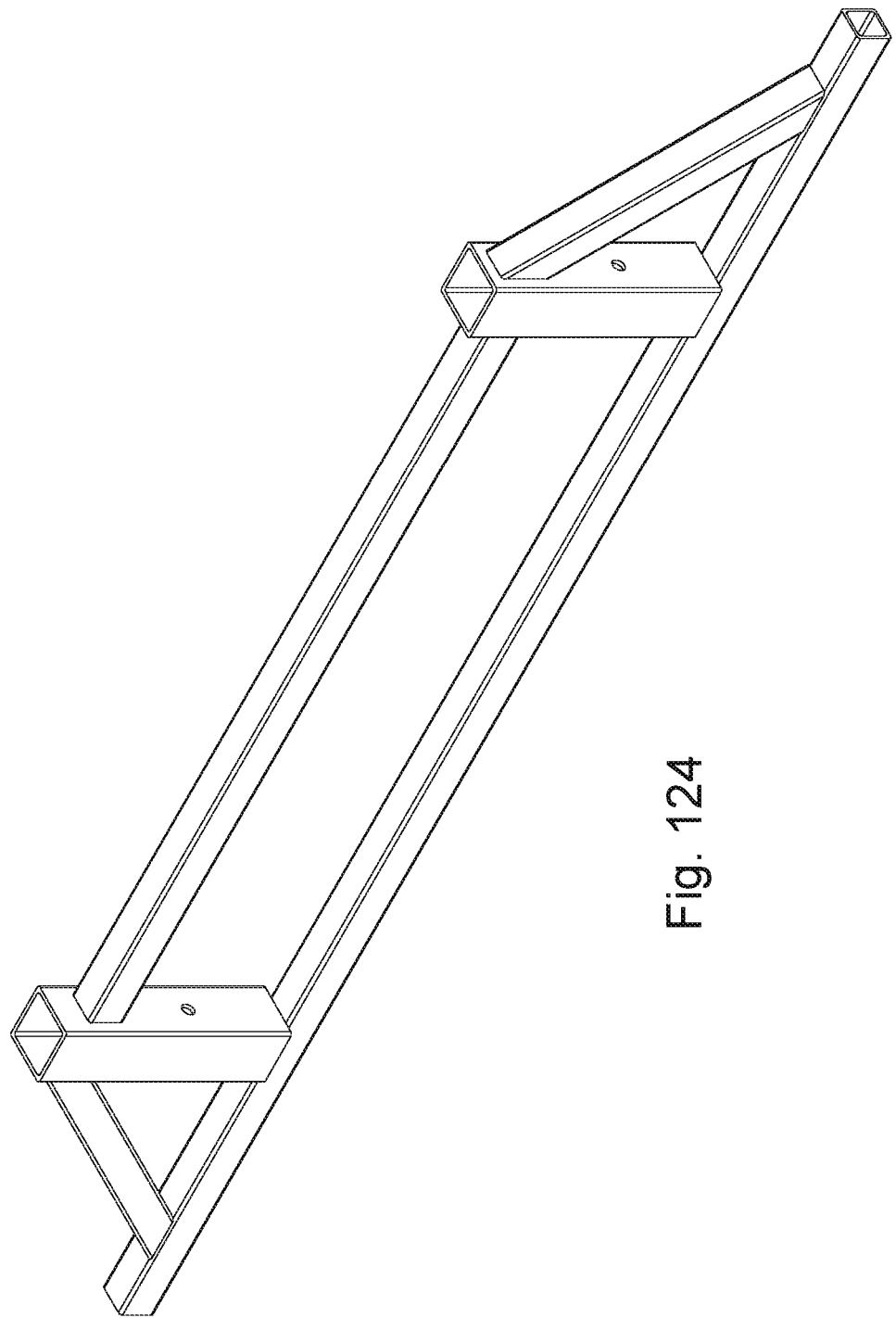
FIG. 124 illustrates an example of a view of the "ATV" trailer weldment according to various embodiments described herein.

Removal of the platform may be accomplished by completing the set up steps in reverse order. In this and preferred embodiments, the base section 11, once removed from the tree, can act as a "basket" in which the pieces of the platform may be placed inside for storage and transport (see FIGS. 55 and 56). A detachable wheel section 48 may be attached to the base section 11 by being pinned in place onto the platform base arms using wire locking pins to provide wheeled transport to the base section. The detachable wheeled section 48 may be made from ¾" and 1¼" steel square hollow tubing, a 37.5" section of ⅝'s round solid steel rod, and a pair of 15"/4.8"/4.00-8", pneumatic, knobby cart tires 50 mounted on 6" hubs with inner bearings and grease fittings while other wheels, materials, and dimensions may be used which are suitable for conveying the weight of the platform and other user equipment. An optional wider detachable wheel section (see FIG. 123) can be used for ATV transport using a 42" wide base section.

In preferred embodiments, elements and pieces of the platform may be made using high strength lightweight aluminum or any other metal alloys and it is the intention of the inventor to develop this version in order to reduce the weight.

The invention claimed is:

1. A portable tree platform comprising:
 a base frame including a fixed biter, forward extending arms, and an adjustable biter, the adjustable biter configured to be movably secured along the forward extending arms of the base frame, wherein the forward extending arms are fixed and configured to be positioned substantially parallel on opposite sides of a tree, the fixed and adjustable biters having gripping members configured to engage with the tree, the gripping members of at least the adjustable biter extending across a width of the adjustable biter and connected between the forward extending arms, wherein the adjustable biter is configured to be displaced along a linear direction within the base frame and relative to the forward extending arms in order to move into and out of engagement with the tree without extending beyond a major length of the forward extending arms, wherein the linear direction is parallel to said major length which is substantially orthogonal to said width, wherein the base frame includes a locking assembly configured to engage the adjustable biter to slidably lock the adjustable biter in one of a plurality of positions along the forward extending arms, and the base frame further including platform support members;
 a floor platform assembly supported on the platform support members, the floor platform assembly comprising an entry platform floor piece including a hinged floor entry door configured to pivot between an open position and a closed position;
 at least two cantilevers pivotally secured to an underside of the floor platform assembly, each of the cantilevers respectively including a cantilever biter at a lower end thereof, and the cantilever biter having gripping members configured to engage with the tree; and,
 a ladder terminating at a position directly below the hinged floor entry door for allowing a user to ascend the ladder, pass through the hinged floor entry door when in the open position, and walk on the floor platform assembly.

2. The portable tree platform according to claim 1, comprising three cantilever biters pivotally secured to the underside of the platform assembly.

3. The portable tree platform according to claim 1, further comprising a lower binder strap coupled with the base frame and extendable around the cantilevers to draw the cantilevers and the cantilever biters toward the tree.

4. The portable tree platform according to claim 3, further comprising an upper binder strap coupled with the base frame, the upper binder strap being extendable around the tree to secure the base frame to the tree.

5. The portable tree platform according to claim 1, further comprising a wheel section selectively attachable to the base frame, the wheel section including a wheel frame, an axle and two wheels, wherein a space between the platform supporting members of the base frame is wide enough to fit the platform assembly in a disassembled, upright orientation such that the platform assembly is supportable by the wheel section for transport.

6. The portable tree platform according to claim 1, wherein the floor platform assembly further comprises an opposite platform floor piece.

7. The portable tree platform according to claim 6, wherein the entry and opposite platform floor pieces comprise seat mounting brackets.

8. The portable tree platform according to claim 6, wherein the entry and opposite platform floor pieces comprise rail mounting brackets, and wherein the portable tree platform further comprises a shooting rail secured in the rail mounting brackets.

9. The portable tree platform according to claim 6, further comprising an anchor brace connected to the ladder, the anchor brace being attachable to the tree.

10. The portable tree platform according to claim 6, further comprising ladder extension sections attachable to the ladder, the ladder extension sections extending a height of the ladder.

11. The portable tree platform according to claim 6, further comprising a pulley system separate from the base frame and independently attachable to the tree, the pulley system facilitating installation of the entry and opposite platform floor pieces onto the platform supporting members of the base frame.

12. The portable tree platform according to claim 6, further comprising a wheel section selectively attachable to the base frame, the wheel section including a wheel frame, an axle and two wheels, wherein a space between the platform supporting members of the base frame is wide enough to fit the entry and opposite platform floor pieces in a disassembled, side-by-side, upright orientation such that the entry and opposite platform floor pieces are supportable by the wheel section for transport.

* * * * *